(12) United States Patent
Sheppard et al.

(10) Patent No.: US 11,669,761 B2
(45) Date of Patent: *Jun. 6, 2023

(54) DETERMINING METRICS CHARACTERIZING NUMBERS OF UNIQUE MEMBERS OF MEDIA AUDIENCES

(71) Applicant: The Nielsen Company (US), LLC, New York, NY (US)

(72) Inventors: Michael Sheppard, Brooklyn, NY (US); Paul Donato, New York, NY (US); Peter C. Doe, Ridgewood, NJ (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 188 days.

This patent is subject to a terminal disclaimer.

(21) Appl. No.: 17/164,486

(22) Filed: Feb. 1, 2021

(65) Prior Publication Data
US 2021/0232959 A1    Jul. 29, 2021

Related U.S. Application Data

(63) Continuation of application No. 15/247,483, filed on Aug. 25, 2016, now Pat. No. 10,909,466.

(51) Int. Cl.
*G06F 16/2458* (2019.01)
*G06N 7/01* (2023.01)
(Continued)

(52) U.S. Cl.
CPC .......... *G06N 7/01* (2023.01); *G06F 16/2462* (2019.01); *H04H 60/31* (2013.01); *H04H 60/45* (2013.01);
(Continued)

(58) Field of Classification Search
CPC ................ G06N 7/005; G06F 16/2462; H04N 21/44226; H04N 21/44213; H04H 60/31; H04H 60/45; H04L 67/535; H04L 67/02
(Continued)

(56) References Cited

U.S. PATENT DOCUMENTS 6,389,593 B1    5/2002  Yamagishi
7,220,910 B2    5/2007  Plastina et al.
(Continued)

OTHER PUBLICATIONS

Hamilton, et al., "Streaming on Twitch: Fostering Participatory Communities of Play within Live Mixed Media", CHI 2014, Toronto, ON, Canda, 2014 (Year: 2014).*
(Continued)

*Primary Examiner* — Tsu-Chang Lee
(74) *Attorney, Agent, or Firm* — Hanley, Flight & Zimmerman, LLC

(57) ABSTRACT

Example methods disclosed herein include accessing a query requesting a metric associated with a number of unique members of an audience of media over an aggregate monitoring interval corresponding to a plurality of component monitoring intervals. Disclosed example methods also include determining respective aggregate interval probability distributions modeling likelihoods of respective monitored individuals being exposed to the media during the aggregate monitoring interval, a first one of the aggregate interval probability distributions for a first one of the monitored individuals being determined by combining parameters of respective component interval probability distributions modeling likelihoods of the first one of the monitored individuals being exposed to the media during respective ones of the component monitoring intervals. Disclosed example methods further include evaluating an audience-level probability distribution determined from the aggregate
(Continued)

interval probability distributions to determine the metric to transmit to the computing device in response to the query.

20 Claims, 8 Drawing Sheets

(51) Int. Cl.
*H04N 21/442* (2011.01)
*H04H 60/45* (2008.01)
*H04H 60/31* (2008.01)
*H04L 67/02* (2022.01)
*H04L 67/50* (2022.01)

(52) U.S. Cl.
CPC ............... *H04N 21/44213* (2013.01); *H04N 21/44226* (2020.08); *H04L 67/02* (2013.01); *H04L 67/535* (2022.05)

(58) Field of Classification Search
USPC .......................................... 706/52
See application file for complete search history.

(56) References Cited

U.S. PATENT DOCUMENTS

| | | | | |
|---|---|---|---|---|
| 8,302,127 B2* | 10/2012 | Klarfeld | ............ | H04N 21/4751 705/14.66 |
| 8,578,403 B2 | 11/2013 | Berezowski et al. | | |
| 8,739,197 B1* | 5/2014 | Pecjak | ............... | H04N 21/2407 725/9 |
| 9,204,189 B1 | 12/2015 | Oztaskent et al. | | |
| 9,326,014 B2 | 4/2016 | Rowe | | |
| 10,909,466 B2 | 2/2021 | Sheppard et al. | | |
| 2002/0133393 A1 | 9/2002 | Tatsumi et al. | | |
| 2003/0093792 A1* | 5/2003 | Labeeb | ................. | H04N 7/163 725/38 |
| 2009/0171767 A1 | 7/2009 | Kolessar | | |
| 2010/0114668 A1 | 5/2010 | Klein et al. | | |
| 2015/0002607 A1 | 1/2015 | Border et al. | | |
| 2018/0060750 A1 | 3/2018 | Sheppard et al. | | |

OTHER PUBLICATIONS

Fan, "The Distribution of the Product of Independent Beta Variables," Communications in Statistics—Theory and Methods, Jun. 27, 2007, 11 pages.

Cheong et al., "The Hyper Beta Distribution as a Web Media Exposure Model," American Academy of Advertising, Conference Proceedings, Lubbock, 2005, pp. 165-173.

United States Patent and Trademark Office, "Notice of Allowance," mailed in connection with U.S. Appl. No. 15/247,483, dated Sep. 23, 2020, 9 pages.

United States Patent and Trademark Office, "Non-final Office Action," mailed in connection with U.S. Appl. No. 15/247,483, dated Mar. 30, 2020, 32 pages.

United States Patent and Trademark Office, "Requirement for Restriction/Election," mailed in connection with U.S. Appl. No. 15/247,483, dated Oct. 9, 2019, 6 pages.

* cited by examiner

DETERMINING METRICS CHARACTERIZING NUMBERS OF UNIQUE MEMBERS OF MEDIA AUDIENCES

RELATED APPLICATION

This patent arises from a continuation of U.S. patent application Ser. No. 15/247,483, which was filed on Aug. 25, 2016, and is titled "DETERMINING METRICS CHARACTERIZING NUMBERS OF UNIQUE MEMBERS OF MEDIA AUDIENCES." Priority to U.S. patent application Ser. No. 15/247,483 is claimed. U.S. patent application Ser. No. 15/247,483 is hereby incorporated herein by reference in its entirety.

FIELD OF THE DISCLOSURE

This disclosure relates generally to audience measurement and, more particularly, to determining metrics characterizing numbers of unique members of media audiences.

BACKGROUND

Traditionally, audience measurement entities determine compositions of audiences exposed to media by monitoring registered panel members and extrapolating their behavior onto a larger population of interest. That is, an audience measurement entity enrolls people that consent to being monitored into a panel and collects relatively accurate demographic information from those panel members via, for example, in-person, telephonic, and/or online interviews. The audience measurement entity then monitors those panel members to determine media exposure information describing media (e.g., television programs, radio programs, movies, streaming media, etc.) exposed to those panel members. By combining the media exposure information with the demographic information for the panel members, and extrapolating the result to the larger population of interest, the audience measurement entity can estimate a size and composition of an overall audience of given media. However, the composition of a panel may over-represent and/or under-represent different demographic groups of the target population, thereby leading to bias in the resulting overall audience estimate.

More recent techniques employed by audience measurement entities to monitoring exposure to Internet accessible media or, more generally, online media expand the available set of monitored individuals to a sample population that may or may not include registered panel members. In some such techniques, demographic information for these monitored individuals can be obtained from one or more database proprietors (e.g., social network sites, multi-service sites, online retailer sites, credit services, etc.) with which the individuals subscribe to receive one or more online services. However, the demographic information available from these database proprietor(s) is typically aggregated over one or more demographic categories. Such aggregation can make determining the number of unique audience members of a given media presentation difficult.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
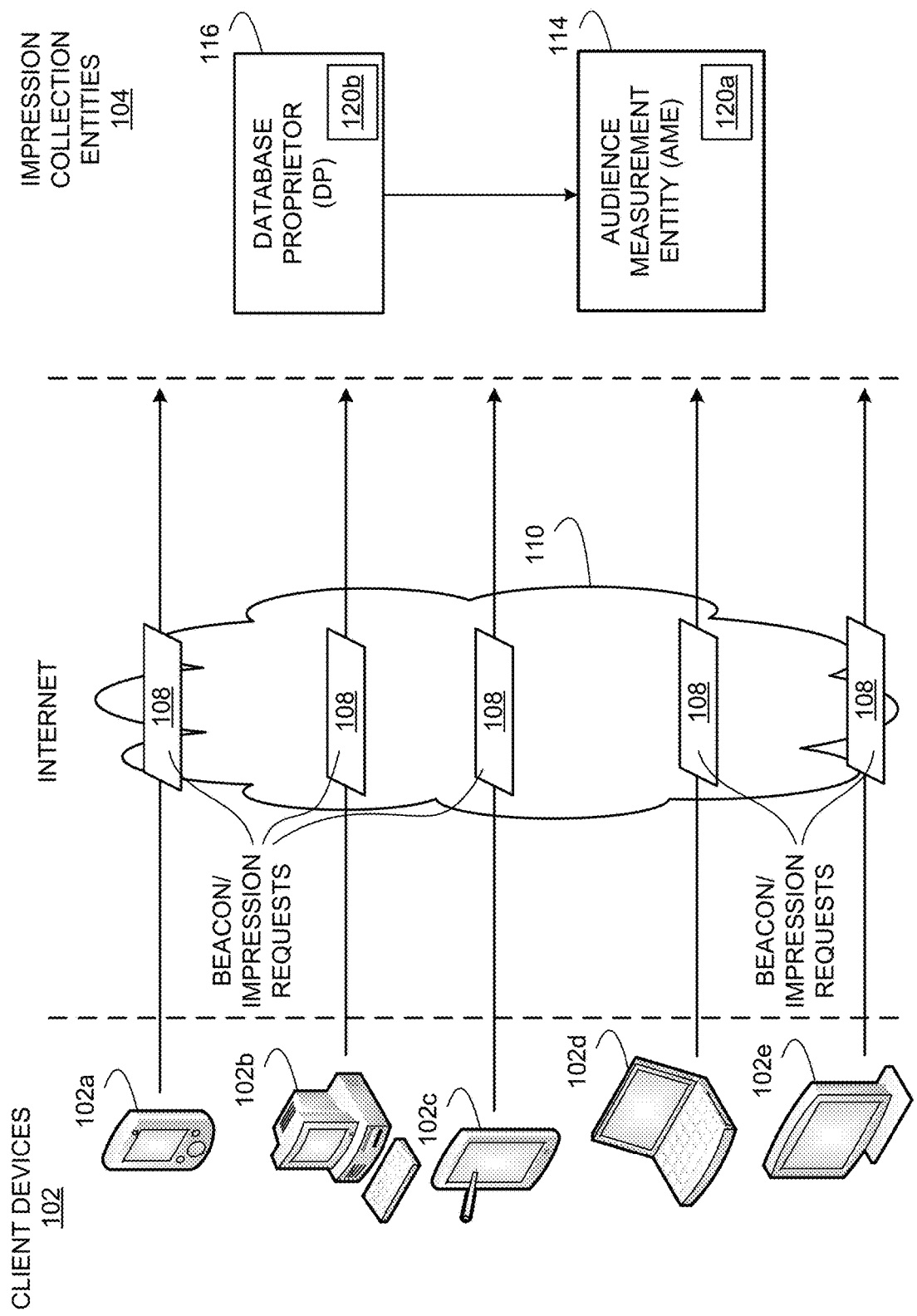
FIG. 1 illustrates example client devices that report audience impressions for Internet-based media to impression collection entities to facilitate identifying numbers of impressions and sizes of audiences exposed to different Internet-based media.

Example methods, apparatus, systems and articles of manufacture (e.g., physical storage media) to determine metrics characterizing numbers of unique members of media audiences are disclosed herein. Example methods disclosed herein to process queries concerning media audiences include accessing a query from a computing device requesting a metric associated with a number of unique members of an audience of media over an aggregate monitoring interval specified in the query, with the aggregate monitoring interval corresponding to multiple component monitoring intervals. For example, the aggregate monitoring interval can be a specified week, day-of-week, daypart, etc., and the corresponding component monitoring intervals can be days-of-week, dayparts, quarter-hour intervals, etc. Examples of metrics requested in such queries can include, but are not limited to, the probability of an estimated number of unique audience members being less than a specified value, the probability of the number of unique audience members being greater than a specified value, the probability of the estimated number of unique audience members being between two specified values, the expected number of unique members estimated to be in the audience, the variance of the number of unique members estimated to be in the audience, etc.

Continuing, disclosed example methods to process queries concerning media audiences also include determining respective aggregate interval probability distributions modeling likelihoods of respective monitored individuals being exposed to the media during the aggregate monitoring interval. For example, a first one of the aggregate interval probability distributions for a first one of the monitored individuals can be determined by combining parameters of respective component interval probability distributions modeling likelihoods of the first one of the monitored individuals being exposed to the media during respective ones of the component monitoring intervals corresponding to the aggregate monitoring interval. Disclosed example methods further include evaluating an audience-level probability distribution determined from the aggregate interval probability distributions to determine the metric to transmit to the computing device in response to the query. For example, the query can be received from the computing device via a network; and a message including the metric can be transmitted to the computing device via the network in response to the query.

In some disclosed example methods, the component interval probability distributions for the first one of the monitored individuals are beta probability distributions specified by respective first shape parameters and second shape parameters, and the first one of the aggregate interval probability distributions is a beta probability distribution specified by a third shape parameter and a fourth shape parameter. Some such disclosed example methods further include retrieving the first shape parameters and the second shape parameters of the component interval probability distributions from memory, and combining the first shape parameters and the second shape parameters of the component interval probability distributions to determine the third shape parameter and the fourth parameter of the first one of the aggregate interval probability distributions. In some such disclosed example methods, the first shape parameter and the second shape parameter of a first one of the component interval probability distributions for the first one of the monitored individuals are different from the first shape parameter and the second shape parameter of a second one of the component interval probability distributions for the first one of the monitored individuals. Additionally or alternatively, in some such disclosed examples, the combining of the first shape parameters and the second shape parameters of the component interval probability distributions includes: (1) combining the first shape parameters and the second shape parameters of the component interval probability distributions according to a first expression to determine the third shape parameter of the first one of the aggregate interval probability distributions, and (2) combining the first shape parameters and the second shape parameters of the component interval probability distributions according to a second expression different from the first expression to determine the fourth shape parameter of the first one of the aggregate interval probability distributions.

Additionally or alternatively, some such disclosed example methods further include numerically convolving the aggregate interval probability distributions for the respective monitored individuals to determine the audience-level probability distribution. In some such disclosed examples, the evaluating of the audience-level probability distribution includes: (1) accessing a query value included in the query, and (2) numerically integrating the audience-level probability distribution based on the query value to determine the metric.

These and other example methods, apparatus, systems and articles of manufacture (e.g., physical storage media) to determine metrics characterizing numbers of unique members of media audiences are disclosed in further detail below.

As noted above, estimating the size of an overall audience or, in other words, the number of unique members of the overall audience of given media can be difficult. For example, panel-based audience measurement techniques may over-represent and/or under-represent different demographic groups of the target population, thereby leading to bias in the resulting overall audience estimate. In census-based audience measurement techniques, which utilize demographic information provided by database proprietor(s), the demographic information may be aggregated, which may also make determining the number of unique audience members of a given media presentation difficult. Furthermore, prior audience measurement techniques may not support determination of statistical metrics associated with the estimated size of the overall audience of media.

In contrast, disclosed example audience metric determination techniques determine statistical metrics characterizing numbers of unique members of media audiences. Such example audience metric determination techniques, as disclosed in further detail below, combine component interval probability distributions modeling likelihoods of a given monitored individual being exposed to given media during different component monitoring intervals (e.g., such as different days of the week, different dayparts of a day, different quarter hour intervals, etc.) to determine an aggregate interval probability distribution modeling a likelihood of the given monitored individual being exposed to the given media at any time during an aggregate monitoring interval made up of the different component monitoring intervals (e.g., such as a week made up of different days of the week, a given day made up of different dayparts, a daypart or hour made up of different quarter hour intervals, etc.). Such disclosed example audience metric determination techniques combine the aggregate interval probability distributions determined for different available monitored individuals to determine an overall audience-level probability distribution modeling the likelihood of different possible unique numbers of monitored individuals being exposed to the given media at any time during the aggregate monitoring interval. Such disclosed example audience metric determination techniques can then evaluate the audience-level probability distribution to determine statistical metrics characterizing the number of unique individuals included in the audience of the given media during the aggregate monitoring interval.

In addition to being able to determine statistical metrics characterizing the number of unique members of media audience, by using probability distributions as disclosed above and in further detail below, disclosed example audience metric determination techniques can reduce memory requirements relative to prior audience measurement techniques. For example, rather than logging and storing collections of media impressions for each monitored individual, disclosed example audience metric determination techniques can replace such collections with a small number of parameters defining the component interval probability distributions for each monitored individual. Such data reduction can result in substantial technological savings in terms of memory/storage savings, power consumption saving, etc., relative to prior audience measurement techniques.

Turning to the figures, FIG. 1 illustrates example client devices 102 that report audience impressions for online (e.g., Internet-based) media to impression collection entities 104 to facilitate determining numbers of impressions and sizes of audiences exposed to different online media. An impression generally refers to an instance of an individual's exposure to media (e.g., content, advertising, etc.). As used herein, the term impression collection entity refers to any entity that collects impression data, such as, for example, audience measurement entities and database proprietors that collect impression data.

The client devices 102 of the illustrated example may be any device capable of accessing media over a network. For example, the client devices 102 may be a computer, a tablet, a mobile device, a smart television, or any other Internet-capable device or appliance. Examples disclosed herein may be used to collect impression information for any type of media, including content and/or advertisements. Media may include advertising and/or content delivered via web pages, streaming video, streaming audio, Internet protocol television (IPTV), movies, television, radio and/or any other vehicle for delivering media. In some examples, media includes user-generated media that is, for example, uploaded to media upload sites, such as YouTube, and subsequently downloaded and/or streamed by one or more other client devices for playback. Media may also include advertisements. Advertisements are typically distributed with content (e.g., programming). Traditionally, content is provided at little or no cost to the audience because it is subsidized by advertisers that pay to have their advertisements distributed with the content. As used herein, "media" refers collectively and/or individually to content and/or advertisement(s).

In the illustrated example, the client devices 102 employ web browsers and/or applications (e.g., apps) to access media, some of which include instructions that cause the client devices 102 to report media monitoring information to one or more of the impression collection entities 104. That is, when a client device 102 of the illustrated example accesses media, a web browser and/or application of the client device 102 executes one or more instructions (e.g., beacon instruction(s)) in the media, which cause the client device 102 to send a beacon request or impression request 108 to one or more impression collection entities 104 via, for example, the Internet 110. The beacon requests 108 of the illustrated example include information about accesses to media at the corresponding client device(s) 102 generating the beacon requests. Such beacon requests allow monitoring entities, such as the impression collection entities 104, to collect impressions for different media accessed via the client devices 102. In this manner, the impression collection entities 104 can generate large impression quantities for different media (e.g., different content and/or advertisement campaigns). Examples techniques for using beacon instructions and beacon requests to cause devices to collect impressions for different media accessed via client devices are further disclosed in at least U.S. Pat. No. 6,108,637 to Blumenau and U.S. Pat. No. 8,370,489 to Mainak, et al., which are incorporated herein by reference in their respective entireties.

The impression collection entities 104 of the illustrated example include an example audience measurement entity (AME) 114 and an example database proprietor (DP) 116. In the illustrated example, the AME 114 does not provide the media to the client devices 102 and is a trusted (e.g., neutral) third party (e.g., The Nielsen Company, LLC) for providing accurate media access statistics. In the illustrated example, the database proprietor 116 is one of many database proprietors that operate on the Internet to provide services to large numbers of subscribers. Such services may include, but are not limited to, email services, social networking services, news media services, cloud storage services, streaming music services, streaming video services, online retail shopping services, credit monitoring services, etc. Example database proprietors include social network sites (e.g., Facebook, Twitter, MySpace, etc.), multi-service sites (e.g., Yahoo!, Google, etc.), online retailer sites (e.g., Amazon.com, Buy.com, etc.), credit services (e.g., Experian), and/or any other web service(s) site that maintains user registration records. In examples disclosed herein, the database proprietor 116 maintains user account records corresponding to users registered for Internet-based services provided by the database proprietors. That is, in exchange for the provision of services, subscribers register with the database proprietor 116. As part of this registration, the subscribers provide detailed demographic information to the database proprietor 116. Demographic information may include, for example, gender, age, ethnicity, income, home location, education level, occupation, etc. In the illustrated example, the database proprietor 116 sets a device/user identifier (e.g., an identifier described below in connection with FIG. 2) on a subscriber's client device 102 that enables the database proprietor 116 to identify the subscriber.

In the illustrated example, when the database proprietor 116 receives a beacon/impression request 108 from a client device 102, the database proprietor 116 requests the client device 102 to provide the device/user identifier that the database proprietor 116 had previously set for the client device 102. The database proprietor 116 uses the device/user identifier corresponding to the client device 102 to identify demographic information in its user account records corresponding to the subscriber of the client device 102. In this manner, the database proprietor 116 can generate demographic impressions by associating demographic information with an audience impression for the media accessed at the client device 102. Thus, as used herein, a demographic impression is an impression that is associated with a characteristic (e.g., a demographic characteristic) of the person exposed to the media. Through the use of demographic impressions, which associate monitored (e.g., logged) impressions with demographic information, it is possible to measure media exposure and, by extension, infer media consumption behaviors across different demographic classifications (e.g., groups) of a sample population of individuals.

In the illustrated example, the AME 114 establishes a panel of users who have agreed to provide their demographic information and to have their Internet browsing activities monitored. When an individual joins the AME panel, the person provides detailed information concerning the person's identity and demographics (e.g., gender, age, ethnicity, income, home location, occupation, etc.) to the AME 114. The AME 114 sets a device/user identifier (e.g., an identifier described below in connection with FIG. 2) on the person's client device 102 that enables the AME 114 to identify the panelist.

In the illustrated example, when the AME 114 receives a beacon request 108 from a client device 102, the AME 114 requests the client device 102 to provide the AME 114 with the device/user identifier the AME 114 previously set for the client device 102. The AME 114 uses the device/user identifier corresponding to the client device 102 to identify demographic information in its user AME panelist records corresponding to the panelist of the client device 102. In this manner, the AME 114 can generate demographic impressions by associating demographic information with an audience impression for the media accessed at the client device 102.

In the illustrated example, the database proprietor 116 reports demographic impression data to the AME 114. To preserve the anonymity of its subscribers, the demographic impression data may be anonymous demographic impression data and/or aggregated demographic impression data. In the case of anonymous demographic impression data, the database proprietor 116 reports user-level demographic impression data (e.g., which is resolvable to individual subscribers), but with any personal identification information removed from or obfuscated (e.g., scrambled, hashed, encrypted, etc.) in the reported demographic impression data. For example, anonymous demographic impression data, if reported by the database proprietor 116 to the AME 114, may include respective demographic impression data for each device 102 from which a beacon request 108 was received, but with any personal identification information removed from or obfuscated in the reported demographic impression data. In the case of aggregated demographic impression data, individuals are grouped into different demographic classifications, and aggregate demographic impression data (e.g., which is not resolvable to individual subscribers) for the respective demographic classifications is reported to the AME 114. For example, aggregate demographic impression data, if reported by the database proprietor 116 to the AME 114, may include first demographic impression data aggregated for devices 102 associated with demographic information belonging to a first demographic classification (e.g., a first age group, such as a group which includes ages less than 18 years old), second demographic impression data for devices 102 associated with demographic information belonging to a second demographic classification (e.g., a second age group, such as a group which includes ages from 18 years old to 34 years old), etc.

In the illustrated example, one or both of the AME 114 and the database proprietor 116 include example audience metric determiners to determine metrics characterizing numbers of unique members of media audiences in accordance with the teachings of this disclosure. For example, the AME 114 may include an example audience metric determiner 120*a* and/or the database proprietor 116 may include an example audience metric determiner 120*b*. As disclosed in further detail below, the audience metric determiner 120*a* and/or 120*b* of the illustrated example combine component interval probability distributions modeling likelihoods of a given monitored individual being exposed to given media during different component monitoring intervals (e.g., such as different days of the week, different dayparts of a day, different quarter hour intervals, etc.) to determine an aggregate interval probability distribution modeling a likelihood of the given monitored individual being exposed to the given media at any time during an aggregate monitoring interval made up of the different component monitoring intervals (e.g., such as a week made up of different days of the week, a given day made up of different dayparts, a daypart or hour made up of different quarter hour intervals, etc.). The example audience metric determiner 120*a* and/or 120*b* then combine the aggregate interval probability distributions determined for different available monitored individuals to determine an overall audience-level probability distribution modeling the likelihood of different possible unique numbers of monitored individuals being exposed to the given media at any time during the aggregate monitoring interval. The example audience metric determiner 120*a* and/or 120*b* then evaluate the audience-level probability distribution to determine statistical metrics characterizing the number of unique individuals included in the audience of the given media during the aggregate monitoring interval.

Figure 2:
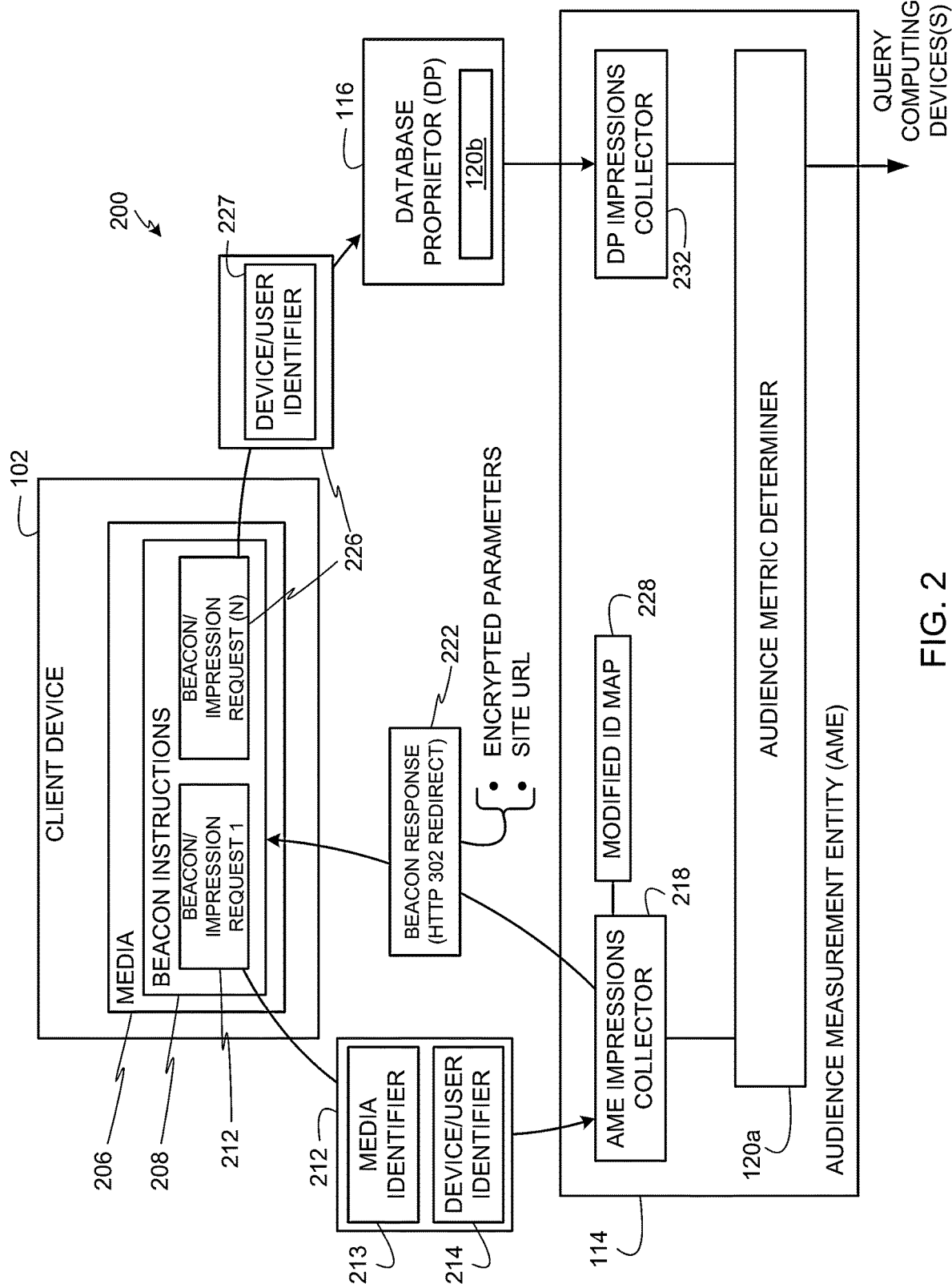
FIG. 2 is an example communication flow diagram illustrating an example manner in which an example audience measurement entity and an example database proprietor can collect impressions and demographic information associated with a client device.

FIG. 2 is an example communication flow diagram 200 illustrating an example manner in which the AME 114 and the database proprietor 116 can collect demographic impressions based on client devices 102 reporting impressions to the AME 114 and the database proprietor 116. FIG. 2 also shows the example audience metric determiners 120*a* and 120*b*, which are able to determine metrics characterizing numbers of unique members of media audiences in accordance with the teachings of this disclosure. The example chain of events shown in FIG. 2 occurs when a client device 102 accesses media for which the client device 102 reports an impression to the AME 114 and/or the database proprietor 116. In some examples, the client device 102 reports impressions for accessed media based on instructions (e.g., beacon instructions) embedded in the media that instruct the client device 102 (e.g., that instruct a web browser or an app in the client device 102) to send beacon/impression requests (e.g., the beacon/impression requests 108 of FIG. 1) to the AME 114 and/or the database proprietor 116. In such examples, the media having the beacon instructions is referred to as tagged media. In other examples, the client device 102 reports impressions for accessed media based on instructions embedded in apps or web browsers that execute on the client device 102 to send beacon/impression requests (e.g., the beacon/impression requests 108 of FIG. 1) to the AME 114 and/or the database proprietor 116 for corresponding media accessed via those apps or web browsers. In some examples, the beacon/impression requests (e.g., the beacon/impression requests 108 of FIG. 1) include device/user identifiers (e.g., AME IDs and/or DP IDs) as described further below to allow the corresponding AME 114 and/or the corresponding database proprietor 116 to associate demographic information with resulting logged impressions.

In the illustrated example, the client device 102 accesses media 206 that is tagged with beacon instructions 208. The beacon instructions 208 cause the client device 102 to send a beacon/impression request 212 to an AME impressions collector 218 when the client device 102 accesses the media 206. For example, a web browser and/or app of the client device 102 executes the beacon instructions 208 in the media 206 which instruct the browser and/or app to generate and send the beacon/impression request 212. In the illustrated example, the client device 102 sends the beacon/impression request 212 using an HTTP (hypertext transfer protocol) request addressed to the URL (uniform resource locator) of the AME impressions collector 218 at, for example, a first Internet domain of the AME 114. The beacon/impression request 212 of the illustrated example includes a media identifier 213 (e.g., an identifier that can be used to identify content, an advertisement, and/or any other media) corresponding to the media 206. In some examples, the beacon/impression request 212 also includes a site identifier (e.g., a URL) of the website that served the media 206 to the client device 102 and/or a host website ID (e.g., www.acme.com) of the website that displays or presents the media 206. In the illustrated example, the beacon/impression request 212 includes a device/user identifier 214. In the illustrated example, the device/user identifier 214 that the client device 102 provides to the AME impressions collector 218 in the beacon impression request 212 is an AME ID because it corresponds to an identifier that the AME 114 uses to identify a panelist corresponding to the client device 102. In other examples, the client device 102 may not send the device/user identifier 214 until the client device 102 receives a request for the same from a server of the AME 114 in response to, for example, the AME impressions collector 218 receiving the beacon/impression request 212.

In some examples, the device/user identifier 214 may be a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore (where HTML is an abbreviation for hypertext markup language), and/or any other identifier that the AME 114 stores in association with demographic information about users of the client devices 102. In this manner, when the AME 114 receives the device/user identifier 214, the AME 114 can obtain demographic information corresponding to a user of the client device 102 based on the device/user identifier 214 that the AME 114 receives from the client device 102. In some examples, the device/user identifier 214 may be encrypted (e.g., hashed) at the client device 102 so that only an intended final recipient of the device/user identifier 214 can decrypt the hashed identifier 214. For example, if the device/user identifier 214 is a cookie that is set in the client device 102 by the AME 114, the device/user identifier 214 can be hashed so that only the AME 114 can decrypt the device/user identifier 214. If the device/user identifier 214 is an IMEI number, the client device 102 can hash the device/user identifier 214 so that only a wireless carrier (e.g., the database proprietor 116) can decrypt the hashed identifier 214 to recover the IMEI for use in accessing demographic information corresponding to the user of the client device 102. By hashing the device/user identifier 214, an intermediate party (e.g., an intermediate server or entity on the Internet) receiving the beacon request cannot directly identify a user of the client device 102.

In response to receiving the beacon/impression request 212, the AME impressions collector 218 logs an impression for the media 206 by storing the media identifier 213 contained in the beacon/impression request 212. In the illustrated example of FIG. 2, the AME impressions collector 218 also uses the device/user identifier 214 in the beacon/impression request 212 to identify AME panelist demographic information corresponding to a panelist of the client device 102. That is, the device/user identifier 214 matches a user ID of a panelist member (e.g., a panelist corresponding to a panelist profile maintained and/or stored by the AME 114). In this manner, the AME impressions collector 218 can associate the logged impression with demographic information of a panelist corresponding to the client device 102.

In some examples, the beacon/impression request 212 may not include the device/user identifier 214 if, for example, the user of the client device 102 is not an AME panelist. In such examples, the AME impressions collector 218 logs impressions regardless of whether the client device 102 provides the device/user identifier 214 in the beacon/impression request 212 (or in response to a request for the identifier 214). When the client device 102 does not provide the device/user identifier 214, the AME impressions collector 218 can still benefit from logging an impression for the media 206 even though it does not have corresponding demographics. For example, the AME 114 may still use the logged impression to generate a total impressions count and/or a frequency of impressions (e.g., an impressions frequency) for the media 206. Additionally or alternatively, the AME 114 may obtain demographics information from the database proprietor 116 for the logged impression if the client device 102 corresponds to a subscriber of the database proprietor 116.

In the illustrated example of FIG. 2, to compare or supplement panelist demographics (e.g., for accuracy or completeness) of the AME 114 with demographics from one or more database proprietors (e.g., the database proprietor 116), the AME impressions collector 218 returns a beacon response message 222 (e.g., a first beacon response) to the client device 102 including an HTTP "302 Found" re-direct message and a URL of a participating database proprietor 116 at, for example, a second Internet domain. In the illustrated example, the HTTP "302 Found" re-direct message in the beacon response 222 instructs the client device 102 to send a second beacon request 226 to the database proprietor 116. In other examples, instead of using an HTTP "302 Found" re-direct message, redirects may be implemented using, for example, an iframe source instruction (e.g., <iframe src=" ">) or any other instruction that can instruct a client device to send a subsequent beacon request (e.g., the second beacon request 226) to a participating database proprietor 116. In the illustrated example, the AME impressions collector 218 determines the database proprietor 116 specified in the beacon response 222 using a rule and/or any other suitable type of selection criteria or process. In some examples, the AME impressions collector 218 determines a particular database proprietor to which to redirect a beacon request based on, for example, empirical data indicative of which database proprietor is most likely to have demographic data for a user corresponding to the device/user identifier 214. In some examples, the beacon instructions 208 include a predefined URL of one or more database proprietors to which the client device 102 should send follow up beacon requests 226. In other examples, the same database proprietor is always identified in the first redirect message (e.g., the beacon response 222).

In the illustrated example of FIG. 2, the beacon/impression request 226 may include a device/user identifier 227 that is a DP ID because it is used by the database proprietor 116 to identify a subscriber of the client device 102 when logging an impression. In some instances (e.g., in which the database proprietor 116 has not yet set a DP ID in the client device 102), the beacon/impression request 226 does not include the device/user identifier 227. In some examples, the DP ID is not sent until the database proprietor 116 requests the same (e.g., in response to the beacon/impression request 226). In some examples, the device/user identifier 227 is a device identifier (e.g., an IMEI), an MEID, a MAC address, etc.), a web browser unique identifier (e.g., a cookie), a user identifier (e.g., a user name, a login ID, etc.), an Adobe Flash® client identifier, identification information stored in an HTML5 datastore, and/or any other identifier that the database proprietor 116 stores in association with demographic information about subscribers corresponding to the client devices 102. In some examples, the device/user identifier 227 may be encrypted (e.g., hashed) at the client device 102 so that only an intended final recipient of the device/user identifier 227 can decrypt the hashed identifier 227. For example, if the device/user identifier 227 is a cookie that is set in the client device 102 by the database proprietor 116, the device/user identifier 227 can be hashed so that only the database proprietor 116 can decrypt the device/user identifier 227. If the device/user identifier 227 is an IMEI number, the client device 102 can hash the device/user identifier 227 so that only a wireless carrier (e.g., the database proprietor 116) can decrypt the hashed identifier 227 to recover the IMEI for use in accessing demographic information corresponding to the user of the client device 102. By hashing the device/user identifier 227, an intermediate party (e.g., an intermediate server or entity on the Internet) receiving the beacon request cannot directly identify a user of the client device 102. For example, if the intended final recipient of the device/user identifier 227 is the database proprietor 116, the AME 114 cannot recover identifier information when the device/user identifier 227 is hashed by the client device 102 for decrypting only by the intended database proprietor 116.

When the database proprietor 116 receives the device/user identifier 227, the database proprietor 116 can obtain demographic information corresponding to a user of the client device 102 based on the device/user identifier 227 that the database proprietor 116 receives from the client device 102.

Although only a single database proprietor 116 is shown in FIGS. 1 and 2, the impression reporting/collection process of FIGS. 1 and 2 may be implemented using multiple database proprietors. In some such examples, the beacon instructions 208 cause the client device 102 to send beacon/ impression requests 226 to numerous database proprietors. For example, the beacon instructions 208 may cause the client device 102 to send the beacon/impression requests 226 to the numerous database proprietors in parallel or in daisy chain fashion. In some such examples, the beacon instructions 208 cause the client device 102 to stop sending beacon/impression requests 226 to database proprietors once a database proprietor has recognized the client device 102. In other examples, the beacon instructions 208 cause the client device 102 to send beacon/impression requests 226 to database proprietors so that multiple database proprietors can recognize the client device 102 and log a corresponding impression. Thus, in some examples, multiple database proprietors are provided the opportunity to log impressions and provide corresponding demographics information if the user of the client device 102 is a subscriber of services of those database proprietors.

In some examples, prior to sending the beacon response 222 to the client device 102, the AME impressions collector 218 replaces site IDs (e.g., URLs) of media provider(s) that served the media 206 with modified site IDs (e.g., substitute site IDs) which are discernable only by the AME 114 to identify the media provider(s). In some examples, the AME impressions collector 218 may also replace a host website ID (e.g., www.acme.com) with a modified host site ID (e.g., a substitute host site ID) which is discernable only by the AME 114 as corresponding to the host website via which the media 206 is presented. In some examples, the AME impressions collector 218 also replaces the media identifier 213 with a modified media identifier 213 corresponding to the media 206. In this way, the media provider of the media 206, the host website that presents the media 206, and/or the media identifier 213 are obscured from the database proprietor 116, but the database proprietor 116 can still log impressions based on the modified values (e.g., if such modified values are included in the beacon request 226), which can later be deciphered by the AME 114 after the AME 114 receives logged impressions from the database proprietor 116. In some examples, the AME impressions collector 218 does not send site IDs, host site IDS, the media identifier 213 or modified versions thereof in the beacon response 222. In such examples, the client device 102 provides the original, non-modified versions of the media identifier 213, site IDs, host IDs, etc. to the database proprietor 116.

In the illustrated example, the AME impression collector 218 maintains a modified ID mapping table 228 that maps original site IDs with modified (or substitute) site IDs, original host site IDs with modified host site IDs, and/or maps modified media identifiers to the media identifiers such as the media identifier 213 to obfuscate or hide such information from database proprietors such as the database proprietor 116. Also in the illustrated example, the AME impressions collector 218 encrypts all of the information received in the beacon/impression request 212 and the modified information to prevent any intercepting parties from decoding the information. The AME impressions collector 218 of the illustrated example sends the encrypted information in the beacon response 222 to the client device 102 so that the client device 102 can send the encrypted information to the database proprietor 116 in the beacon/ impression request 226. In the illustrated example, the AME impressions collector 218 uses an encryption that can be decrypted by the database proprietor 116 site specified in the HTTP "302 Found" re-direct message.

Periodically or aperiodically, the impression data collected by the database proprietor 116 is provided to a DP impressions collector 232 of the AME 114 as, for example, batch data. In some examples, the impression data collected from the database proprietor 116 by the DP impressions collector 232 is demographic impression data.

Additional examples that may be used to implement the beacon instruction processes of FIG. 2 are disclosed in U.S. Pat. No. 8,370,489 to Mainak et al. In addition, other examples that may be used to implement such beacon instructions are disclosed in U.S. Pat. No. 6,108,637 to Blumenau.

In the example of FIG. 2, the AME 114 includes the example audience metric determiner 120a to determine metrics characterizing numbers of unique members of audiences of media corresponding to collected impressions. Additionally or alternatively, in the example of FIG. 2, the database proprietor 116 includes the example audience metric determiner 120b to metrics characterizing numbers of unique members of audiences of media corresponding to collected impressions. A block diagram of an example audience metric determiner 120, which may be used to implement one or both of the example audience metric determiners 120a and/or 120b, is illustrated in FIG. 3.

Figure 3:
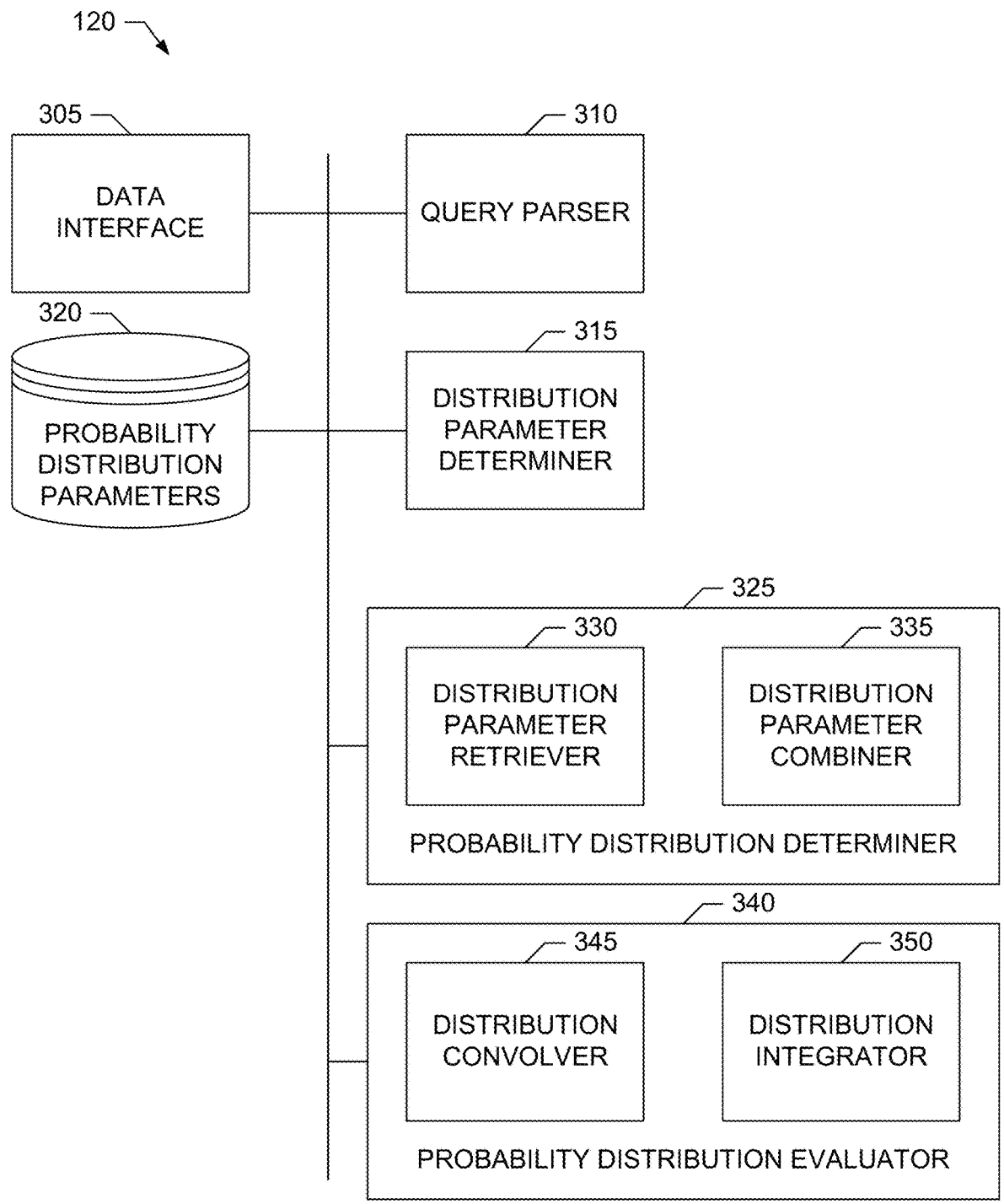
FIG. 3 is a block diagram of an example probabilistic audience estimator that may be included in the example audience measurement entity and/or the example database proprietor of FIGS. 1 and/or 2 to determine metrics characterizing numbers of unique members of media audiences in accordance with the teachings of this disclosure.

The example audience metric determiner 120 of FIG. 3 includes an example data interface 305 to interface with an example network, such as the Internet 110, to receive queries from computing devices (e.g., as shown in FIG. 2) requesting audience metrics. For example, a query received by the data interface 305 from a computing device can request a metric associated with a number of unique members of an audience of media identified in the query over an aggregate monitoring interval specified in the query. Examples of metrics that may be requested in such queries include, but are not limited to, the probability of an estimated number of unique audience members being less than a specified value, the probability of the number of unique audience members being greater than a specified value, the probability of the estimated number of unique audience members being between two specified values, the expected number of unique members estimated to be in the audience, the variance of the number of unique members estimated to be in the audience, etc. The example data interface 305 also interfaces with the example network, such as the Internet 110, to transmit messages including the requested audience metrics to the requesting computing devices in response to such queries. Any type(s) and/or number(s) of computing devices, such as personal computers, mobile devices, Internet clients, servers, etc., can send queries to and receive responses from the audience metric determiner 120 via the data interface 305.

The example audience metric determiner 120 of FIG. 3 also includes an example query parser 310 to parse the audience metric queries received from computing devices via the data interface 305. In some examples, audience metric queries supported by the audience metric determiner 120 can be specified and constructed to have one or more data fields including values defining the particular audience metrics being requested. For example, audience metric queries may be defined to include a media identifier field identifying the particular media (e.g., television program, episode, movie, radio show, etc.) for which an audience metric is to be determined. The audience metric queries may also be defined to include an aggregate monitoring interval field specifying the aggregate monitoring interval for the audience metric being requested. Audience metric queries may further be defined to include a metric type field specifying the type of audience metric being requested, as well as one or more value fields specifying values associated the type of audience metric being requested. For example, the type field could be specified to contain numerical values mapped to supported types of audience metrics including, but not limited to, (1) a first numerical value to indicate the requested metric is the probability of an estimated number of unique audience members being less than a value also specified in a field of a query, (2) a second numerical value to indicate the requested metric is the probability of the number of unique audience members being greater than a value also specified in a field of a query, (3) a third numerical value to indicate the requested metric is the probability of the estimated number of unique audience members being between two values also specified in fields of the query, (4) a fourth numerical value to indicate the requested metric is the expected number of unique members estimated to be in the audience, (5) a fifth numerical value to indicate the requested metric is the variance of the number of unique members estimated to be in the audience, etc. As such, the number of value fields included in a particular audience metric query may vary and depend on the value of the type field specifying the type of metric being requested. The query parser 310 of the illustrated example parses an audience metric query received from a computing device via the data interface 305 to determine media identifier, the aggregate monitoring interval, audience metric type and any associated metric values specified in the received query.

The example audience metric determiner 120 of FIG. 3 also includes an example distribution parameter determiner 315 to determine distribution parameters defining component interval probability distributions modeling likelihoods of a given monitored individual being exposed to given media during different component monitoring intervals (e.g., such as different days of the week, different dayparts of a day, different quarter hour intervals, etc.). As described above and in further detail below, for each monitored individual potentially contributing to the audience of given media, the audience metric determiner 120 combines the individual's component interval probability distributions for the component monitoring intervals making up or otherwise included in the specified aggregate monitoring interval to determine an aggregate interval probability distribution for the monitored individual. The audience metric determiner 120 then uses the aggregate interval probability distributions determined for the different monitored individuals to further determine an audience-level probability distribution modeling the likelihood of different possible unique numbers of monitored individuals being exposed to the given media at any time during the aggregate monitoring interval. The audience metric determiner 120 can then evaluate the audience-level probability distribution using the parameter values specified in a received query to determine the audience metric requested in the received query.

In the illustrated example of FIG. 3, the distribution parameter determiner 315 uses the example data interface 305 to access the impression data collected by the AME impressions collector 218 and/or the DP impressions collector 232 to determine respective sets of component interval probability distributions for the individuals being monitored by, for example, the AME 114 in combination with the DP(s) 116. In some examples, the distribution parameter determiner 315 uses the impression data collected by the AME impressions collector 218 and/or the DP impressions collector 232 for past component monitoring intervals to estimate one or more parameters defining the component interval probability distributions corresponding to respective future component monitoring intervals. Each such component interval probability distribution models the likelihood that a given monitored individual was exposed to a particular instance of media during a respective component monitoring interval. For example, a first component interval probability distribution for a given monitored individual may model the likelihood that the individual was exposed to the particular instance of media on a first day, during a first daypart, during a first quarter-hour intervals, etc., whereas a second component interval probability distribution for the given individual may model the likelihood that the individual was exposed to the particular instance of media on a second day, during a second daypart, during a second quarter-hour intervals, etc., and so on for the other component interval probability distribution determined for that given individual. Accordingly, the parameter(s) determined by the distribution parameter determiner 315 to define the component interval probability distributions for different ones of the possible component monitoring intervals may be different, or the same, for a given monitored individual.

In some examples, the component interval probability distributions determined by the distribution parameter determiner 315 are beta distributions that are defined by two shape parameters, $a_{ijm}$ and $b_{ijm}$, where i ranges over the monitored individuals, j ranges over the possible component monitoring intervals, and m ranges over the different possible instances of media being monitored. As such, the shape parameters may vary from individual to individual, from component monitoring interval to component monitoring interval, from media to media, or any combination thereof. Mathematically, a component interval beta probability distribution, $p_{ijm}(x)=\beta(x; a_{ijm}, b_{ijm})$, for a given monitored individual i, a given component monitoring interval j and given media m is represented by Equation 1, which is:

$$p_{ijm}(x) = \beta(x; a_{ijm}, b_{ijm}) = \frac{x^{a_{ijm}-1}(1-x)^{b_{ijm}-1}}{B(a_{ijm}, b_{ijm})} \quad \text{Equation 1}$$

where B(a, b) is the beta function. In Equation 1, x ranges from 0 to 1 and represents the range of likelihoods that the monitored individual i was exposed to given media m during the component monitoring interval j, and $p_{ijm}(x)=\beta(x; a_{ijm}, b_{ijm})$ represents the weight of each likelihood.

The expected value E(x) and second moment $E(x^2)$ of the beta distribution $p_{ijm}(x)=\beta(x; a_{ijm}, b_{ijm})$ of FIG. 1 are functions of the shape parameters, $a_{ijm}$ and $b_{ijm}$, as shown in Equations 2 and 3, respectively:

$$E(x) = \frac{a}{a+b} \quad \text{Equation 2}$$

$$E(x^2) = \frac{a(a+1)}{(a+b)(a+b+1)} \quad \text{Equation 3}$$

(In Equation 2 and 3, the subscripts i, j and m have been omitted from the shape parameters for convenience). In some examples, the distribution parameter determiner 315 uses the relationships between the shape parameters, $a_{ijm}$ and $b_{ijm}$, and the expected value E(x) and second moment $E(x^2)$ shown in Equations 2 and 3 to estimate the shape parameters, $a_{ijm}$ and $b_{ijm}$, for a given component interval probability distribution $p_{ijm}(x)=\beta(x; a_{ijm}, b_{ijm})$. For example, the distribution parameter determiner 315 can access the impression data collected by the AME impressions collector 218 and/or the DP impressions collector 232 for given media m during past component monitoring intervals j for a given individual i and use any appropriate statistical estimation technique to estimate the expected value E(x) and second moment $E(x^2)$ of an impression occurring for that individual and media m during a future component monitoring interval j. Then, using Equations 2 and 3, the distribution parameter determiner 315 can use the estimate expected value E(x) and second moment $E(x^2)$ to solve for the shape parameters shape parameters, $a_{ijm}$ and $b_{ijm}$, defining the component interval beta probability distribution $p_{ijm}(x)=\beta(x; a_{ijm}, b_{ijm})$ for that individual i and that future component monitoring interval j. In such examples, the distribution parameter determiner 315 can repeat this process for different individuals i, component monitoring intervals j and media m to determine respective sets of component interval beta probability distribution $p_{ijm}(x)=\beta(x; a_{ijm}, b_{ijm})$ for the different monitored individuals being exposed to given media during the different component monitoring intervals.

The example audience metric determiner 120 of FIG. 3 includes an example probability distribution parameter storage 320 to store the parameters determined by the distribution parameter determiner 315 to define the respective sets of component interval probability distributions modeling the likelihoods of the different monitored individuals being exposed to given media during the different component monitoring intervals. For example, the distribution parameter determiner 315 may use the probability distribution parameter storage 320 to store, for different monitored media, the shape parameters, $a_{ijm}$ and $b_{ijm}$, defining the different component interval beta probability distributions $p_{ijm}(x)=\beta(x; a_{ijm}, b_{ijm})$ for different monitored individuals i begin exposed to the media m during different component monitoring intervals j. The example probability distribution parameter storage 320 may be implemented by any number(s) and/or type(s) of volatile and/or non-volatile memory, storage, etc., or combination(s) thereof, such as the example volatile memory 814 and/or the example mass storage device(s) 828 of FIG. 8, which is described in further detail below.

The example probabilistic ratings determiner 120 of FIG. 3 further includes an example probability distribution determiner 325 to access a query received from a computing device requesting an audience metric associated with a number of unique members of an audience of media identified in the query and over an aggregate monitoring interval specified in the query. For example, the probability distribution determiner 325 may access the query by accessing fields of the query parsed by the query parser 310. The example probability distribution determiner 325 is also to determine respective aggregate interval probability distributions modeling likelihoods of respective monitored individuals being exposed to the media during the aggregate monitoring interval specified in the query. In some examples, to determine such an aggregate interval probability distribution for a given monitored individual, the example probability distribution determiner 325 accesses the respective sets of component interval probability distributions determined by the distribution parameter determiner 315 to model the likelihoods that the given monitored individual was exposed to the particular instance of media identified in a query during respective ones of the different possible component intervals making up or otherwise corresponding to the aggregate monitoring interval specified in the query. Then, for the given monitored individual, the probability distribution determiner 325 combines the component interval probability distributions to form the aggregate interval probability distribution modeling the likelihood that the given individual was exposed to the particular instance of media during any of the component monitoring intervals making up or otherwise corresponding to aggregate monitoring interval. For example, the aggregate interval probability distribution for a given individual may model the likelihood that the individual was exposed to the particular instance of media identified in the query on any monitored day of a specified week, during any monitored daypart, during any monitored quarter-hour intervals, etc.

In some such examples, the probability distribution determiner 325 determines the aggregate interval probability distribution for the given individual by (i) determining the probability distribution modeling the likelihood that the given individual did not view the particular instance of media during any of the component monitoring intervals making up or otherwise corresponding to the aggregate monitoring interval and then (ii) subtracting that determined probability distribution from a constant value of 1. For example, assume that there are N component monitoring intervals making up or otherwise corresponding to the aggregate monitoring interval specified in the received query, and the component interval probability distributions for a given individual i being exposed to a particular instance of media m during each of the N component monitoring intervals j are $p_{ijm}(x)$, where j=1, . . . , N. Then, the probability distributions modeling the likelihoods that the given individual did not view the particular instance of media m during each of the N component monitoring intervals j are $q_{ijm}(x)=(1-p_{ijm}(x))$, where j=1, . . . , N. Thus, the probability distribution determiner 325 can determine the probability distribution modeling the likelihood that the given individual did not view the particular instance of media during any of the component monitoring intervals making up or otherwise corresponding to the aggregate monitoring interval as the product of the probability distributions $q_{ijm}(x)=(1-p_{ijm}(x))$, i.e., $\Pi_{j=1}^{N} q_{ijm}(x)=\Pi_{j=1}^{N}(1-p_{ijm}(x))$. Furthermore, the probability distribution determiner 325 can determine the aggregate interval probability distribution, $f_{im}(x)$, for the given individual i being exposed to the media m at any time during the aggregate monitoring interval by subtracting this product from 1, which is shown mathematically in Equation 4 as:

$$f_{im}(x)=1-\Pi_{j=1}^{N} q_{ijm}(x)=1-\Pi_{j=1}^{N}(1-p_{ijm}(x)) \qquad \text{Equation 4}$$

In examples in which the audience metric determiner 120 uses beta distributions $\beta(x; a_{ijm}, b_{ijm})$ to represent the component interval probability distributions $p_{ijm}(x)$, the probability distribution determiner 325 can also use beta distributions to represent the aggregate interval probability distributions $f_{im}(x)$ for monitored individuals. Moreover, the probability distribution determiner 325 can determine the shape parameters of the beta distributions representing the aggregate interval probability distributions $f_{im}(x)$ directly by combining the shape parameters of the beta distributions $\beta(x; a_{ijm}, b_{ijm})$ representing the component interval probability distributions $p_{ijm}(x)$. Accordingly, in some such examples, such as the illustrated example of FIG. 3, the probability distribution determiner 325 includes an example distribution parameter retriever 330 and an example distribution parameter combiner 335. In the illustrated example, the distribution parameter retriever 330 to retrieve, from the probability distribution parameter storage 320, the shape parameters, $a_{ijm}$ and $b_{ijm}$, for the component interval probability distributions $p_{ijm}(x)=\beta(x; a_{ijm}, b_{ijm})$ for particular media m identified in the received query and for those component monitoring intervals j making up or otherwise corresponding to the aggregate monitoring interval specified in the received query For example, if the specified aggregate monitoring interval is a particular week, the distribution parameter retriever 330 may retrieve the first shape parameters, $a_{ijm}$, and the second shape parameters, $b_{ijm}$, for the component interval probability distributions $p_{ijm}(x)=\beta(x; a_{ijm}, b_{ijm})$ corresponding to the particular days of that week or the dayparts forming the particular days of that week, etc.

In the illustrated example, the distribution parameter combiner 335 is to combine the first shape parameters, $a_{ijm}$, and the second shape parameters, $b_{ijm}$, retrieved by the probability distribution determiner 325 for a given individual i and appropriate component monitoring intervals j for the media m to determine shape parameters $c_{im}$ and $d_{im}$ defining the beta distribution $\beta_{im}(x; c_{im}, d_{im})$ representing the aggregate interval probability distributions $f_{im}(x)$ for the given individual i being exposed to the media m identified in the query at any time during the aggregate monitoring interval specified in the query. For example, in the case of the component interval probability distributions $p_{ijm}(x)$ being represented by beta distributions $\beta(x; a_{ijm}, b_{ijm})$ having shape parameters $a_{ijm}$ and $b_{ijm}$, the probability distribution $q_{ijm}(x)=(1-p_{ijm}(x))$ is also a beta distribution, but with the shape parameters reversed, i.e., $q_{ijm}(x)=\beta(x; a'_{ijm}, b'_{ijm})$, where $a'_{ijm}=b_{ijm}$ and $b'_{ijm}=a_{ijm}$. Furthermore, the product of the probability distributions $q_{ijm}(x)$, i.e., $\Pi_{j=1}^{N} q_{ijm}(x)$, can be approximated by a beta distribution $\beta(x; c'_{im}, d'_{im})$ having shape parameters $C'_{im}$ and $d'_{im}$ given by the following mathematical expressions provided in Equations 5 and 6:

$$c'_{im} = \frac{S(S-T)}{T-S^2} \qquad \text{Equation 5}$$

$$d'_{im} = \frac{(S-T)(1-S)}{T-S^2} \qquad \text{Equation 6}$$

In Equations 5 and 6, the values S and T are functions of the first shape parameters, $a_{ijm}$, and the second shape parameters, $b_{ijm}$, for the component interval probability distributions $p_{ijm}(x)=\beta(x; a_{ijm}, b_{ijm})$. The mathematical expressions for S and T are provided in Equations 7 and 8:

$$S = \prod_{j=1}^{N} \frac{a'_{ijm}}{a'_{ijm}+b'_{ijm}} = \prod_{j=1}^{N} \frac{b_{ijm}}{a_{ijm}+b_{ijm}} \qquad \text{Equation 7}$$

$$T = \prod_{j=1}^{N} \frac{a'_{ijm}(a'_{ijm}+1)}{(a'_{ijm}+b'_{ijm})(a'_{ijm}+b'_{ijm}+1)} = \prod_{j=1}^{N} \frac{b_{ijm}(b_{ijm}+1)}{(a_{ijm}+b_{ijm})(a_{ijm}+b_{ijm}+1)} \qquad \text{Equation 8}$$

Because $f_{im}(x)=1-\Pi_{j=1}^{N} q_{ijm}(x)$, the aggregate interval probability distribution can be approximated by a beta distribution with the shape parameters $c'_{im}$ and $d'_{im}$ being reversed, i.e., $f_{im}(x)=\beta(x; c_{im}, d_{im})$, where $c_{im}=d'_{im}$ and $d_{im}=c'_{im}$.

Based on the foregoing description, the probability distribution determiner 325 of the illustrated example determines the aggregate interval probability distribution, $f_{im}(x)$, for a given individual i being exposed to the media m at any time during an aggregate monitoring interval made up of component monitoring intervals j=1, . . . , N as a beta distribution $f_{im}(x)=(x; c_{im}, d_{im})$ with shape parameters and $d_{im}$. The example distribution parameter combiner 335 of the probability distribution determiner 325 determines the shape parameters and $d_{im}$ by combining the shape parameters $a_{ijm}$ and $b_{ijm}$ for the component interval probability distributions $p_{ijm}(x)=\beta(x; a_{ijm}, b_{ijm})$ for the particular media m identified in the received query and for those component monitoring intervals j making up or otherwise corresponding to the aggregate monitoring interval specified in the received query. For example, using Equations 5-8 above and the relationships that $c_{im}=d'_{im}$ and $d_{im}=c'_{im}$, the example distribution parameter combiner 335 determines the shape parameters by combining the shape parameters $a_{ijm}$ and $b_{ijm}$ according to the following mathematic expression given by Equation 9:

$$c_{im} = \frac{(S-T)(1-S)}{T-S^2} \qquad \text{Equation 9}$$

and determines the shape parameters $d_{im}$ by combining the shape parameters $a_{ijm}$ and $b_{ijm}$ according to the following mathematic expression given by Equation 10:

$$d_{im} = \frac{S(S-T)}{T-S^2} \qquad \text{Equation 10}$$

where S and T are determines using Equations 7 and 8 provided above. The probability distribution determiner 325 can repeat this process for different available monitored individuals i to determine respective aggregate interval beta probability distributions $f_{im}(x)=\beta(x; c_{im}, d_{im})$ for the different monitored individuals i being exposed to the media m identified in the received query at any time during an aggregate monitoring interval specified in the received query and made up of component monitoring intervals j=1, . . . , N.

To determine and evaluate an overall audience-level probability distribution $f_m(x)$ modeling the likelihood of different possible unique numbers of monitored individuals being exposed to the media m at any time during the aggregate monitoring interval specified in a received query, the example audience metric determiner 120 of FIG. 3 includes an example probability distribution evaluator 340. The probability distribution evaluator 340 of the illustrated example includes an example distribution convolver 345 to numerically convolve the aggregate interval probability distributions $f_{im}(x)$ determined by the probability distribution determiner 325 for the respective monitored individuals i and identified media m to determine the audience-level probability distribution $f_m(x)$. For example, the probability distribution evaluator 340 can determine the audience-level probability distribution $f_m(x)$ using any appropriate numerical convolution technique to evaluate the mathematical expression given by Equation 11:

$$f_m(x)=f_{1m}(x)*f_{2m}(x)* \ldots *f_{Am}(x) \qquad \text{Equation 11}$$

In Equation 11, the operator * represents mathematical convolution, and A is the total number of available monitored individuals, i.e., i=1, . . . , A.

The probability distribution evaluator 340 of the illustrated example also includes an example distribution integrator 350 to evaluate the audience-level probability distribution to determine the audience metric requested in the received query by, for example, accessing a query value included in the query, and numerically integrating the audience-level probability distribution $f_m(x)$ based on the query value to determine the metric. For example, if the metric type field indicates the requested metric is the probability $P_m(x<N)$ of an estimated number of unique audience members of media m identified in the query being less than a value N also specified in a field of a query, the example distribution integrator 350 can determine the requested metric by numerically integrating the audience-level probability distribution $f_m(x)$ from 0 to N according to Equation 12:

$$P_m(x < N) = \int_0^N f_m(x)dx \qquad \text{Equation 12}$$

If the metric type field indicates the requested metric is the probability $P_m(x>M)$ of an estimated number of unique audience members of media m identified in the query being greater than a value M also specified in a field of a query, the example distribution integrator 350 can determine the requested metric by numerically integrating the audience-level probability distribution $f_m(x)$ from M to the maximum number of monitored individuals A according to Equation 13:

$$P_m(x < N) = \int_M^A f_m(x)dx \qquad \text{Equation 13}$$

If the metric type field indicates the requested metric is the probability $P_m(x>M)$ of an estimated number of unique audience members of media m identified in the query being between two values K and L also specified in fields of the query, the example distribution integrator 350 can determine the requested metric by numerically integrating the audience-level probability distribution $f_m(x)$ from K to L according to Equation 14:

$$P_m(x < N) = \int_K^L f_m(x)dx \qquad \text{Equation 14}$$

If the metric type field indicates the requested metric is the expected number $E_m(x)$ of unique members estimated to be in the audience of media m identified in the query, the example distribution integrator 350 can determine the requested metric by numerically integrating the audience-level probability distribution $f_m(x)$ multiplied by x over the range of possible audience sizes 0 to A according to Equation 15:

$$E_m(x) = \int_0^A x f_m(x)dx \qquad \text{Equation 15}$$

If the metric type field indicates the requested metric is the variance $Var_m(x)$ of the number of unique members estimated to be in the audience, the example distribution integrator 350 can determine the requested metric by numerically integrating the audience-level probability distribution $f_m(x)$ multiplied by $(x^2 - E_m(x))$ over the range of possible audience sizes 0 to A according to Equation 16:

$$Var_m(x) = \int_0^A (x^2 - E_m(x)) f_m(x)dx \qquad \text{Equation 16}$$

In Equation 15, the value of $E_m(x)$ can be determined by the example distribution integrator 350 using the expression of Equation 14. As noted above, after determining the audience metric requested in the received query, the probability distribution evaluator 340 of the illustrated example returns the metric to the requesting computing device in a message transmitted via the data interface 305.

Figure 4:
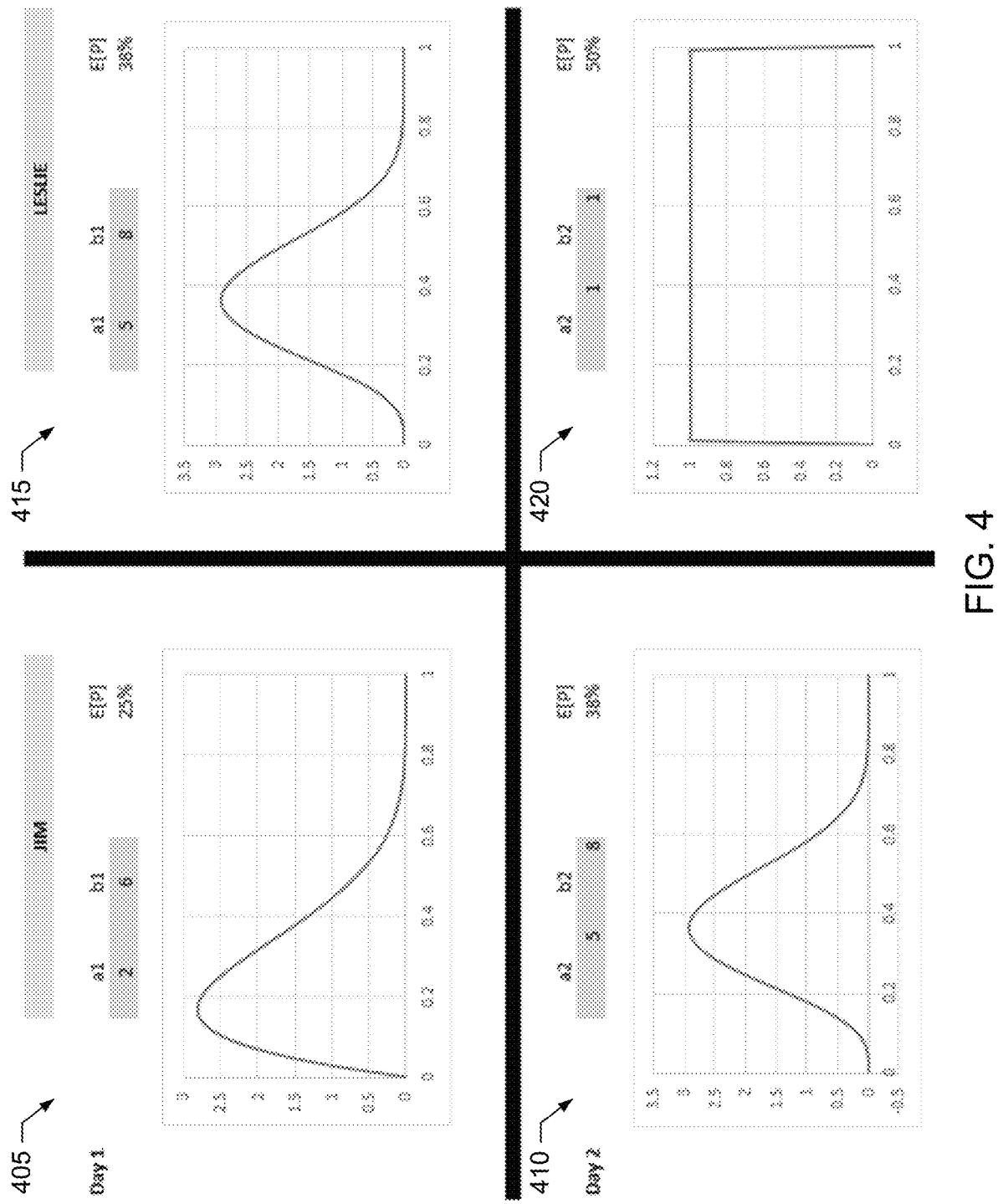
FIGS. 4-6 illustrate example probability distributions utilized by the example probabilistic audience estimator of FIG. 3 to determine metrics characterizing numbers of unique members of media audiences in accordance with the teachings of this disclosure.

FIG. 4 illustrates example component interval probability distributions $p_{ijm}(x)=\beta(x; a_{ijm}, b_{ijm})$ used by the example audience metric determiner 120 of FIG. 3 to determine an audience metric requested in a query received from a computing device. The example component interval probability distributions of FIG. 4 include a first example component interval probability distribution 405 that is a beta distribution $p_{11m}(x)=\beta(x; a_{11m}=2, b_{11m}=6)$ modeling the likelihood of a first monitored individual named "Jim" being exposed to given media m during a first component monitoring interval, such as a first day labeled "Day 1" in FIG. 4. The example component interval probability distributions of FIG. 4 also include a second example component interval probability distribution 410 that is a beta distribution $p_{12m}(x)=\beta(x; a_{12m}=5, b_{12m}=8)$ modeling the likelihood of the first monitored individual named "Jim" being exposed to the given media m during a second component monitoring interval, such as a second day labeled "Day 2" in FIG. 4. The example component interval probability distributions of FIG. 4 further include third and fourth example component interval probability distributions 415 and 420 that are beta distributions $p_{21m}(x)=\beta(x; a_{21m}=5, b_{21m}=8)$ and $p_{22m}(x)=\beta(x; a_{22m}=1, b_{22m}=1)$, respectively, modeling the likelihood of a second monitored individual named "Leslie" being exposed to the given media m during the first component monitoring interval ("Day 1) and the second component monitoring interval ("Day 2"), respectively. In some examples, the distribution parameter determiner 315 of the audience metric determiner 120 uses the impression data collected by the AME impressions collector 218 and/or the DP impressions collector 232 for past component monitoring intervals to estimate the first and second shape of the different component interval probability distributions 405-420.

Figure 5:
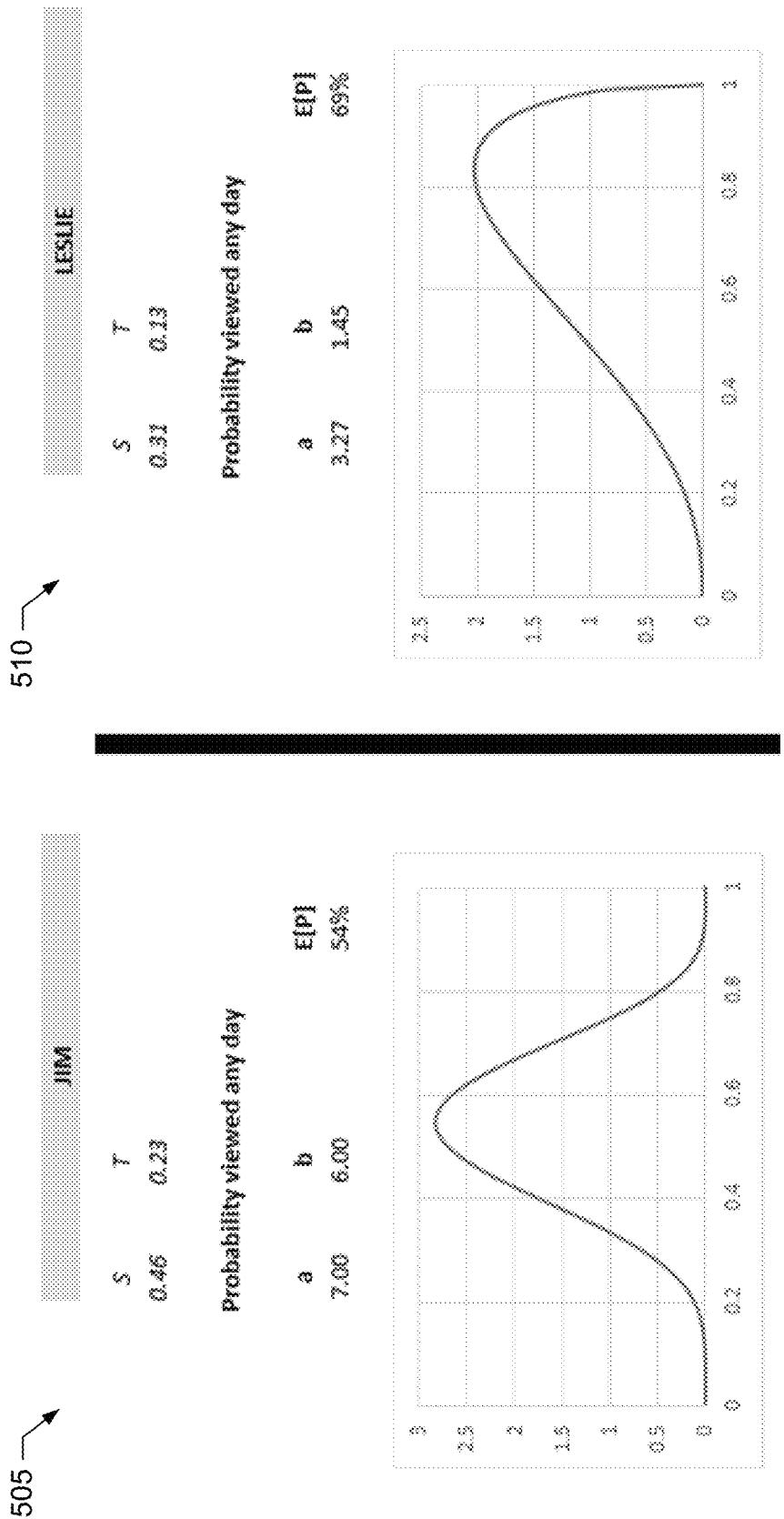

FIG. 5 illustrates example aggregate interval probability distributions $f_{im}(x)=\beta(x; c_{im}, d_{im})$ determined by the example audience metric determiner 120 of FIG. 3 for the different monitored individuals "James" and "Leslie" being exposed to the given media m identified in the received query at any time during an aggregate monitoring interval specified in the received query and made up of the component monitoring intervals "Day 1" and "Day 2." For example, after determining "James" and "Leslie" are available monitored individuals and the aggregate monitoring interval includes the "Day 1" and 'Day 2" component monitoring intervals, the example distribution parameter retriever 330 of the example probability distribution determiner 325 included in the example audience metric determiner 120 retrieves the shape parameters for the example component interval probability distributions 405-420 of FIG. 4. The example distribution parameter combiner 335 of the example probability distribution determiner 325 included in the example audience metric determiner 120 then combines, as described above, the shape parameters of the first and second example component interval probability distributions 405-410 to determine a first example aggregate interval probability distribution 505, which is an example beta distribution $f_{1m}(x)=\beta(x; c_{1m}=7, d_{1m}=6)$ modeling the likelihood of "James" being exposed to the given media m at any time during the aggregate monitoring interval made of the "Day 1" and "Day 2" component monitoring intervals. Similarly, the example distribution parameter combiner 335 of the example probability distribution determiner 325 included in the example audience metric determiner 120 combines, as described above, the shape parameters of the third and fourth example component interval probability distributions 415-415 to determine a second aggregate interval probability distribution 510, which is an example beta distribution $f_{2m}(x)=\beta(x; c_{2m}=3.27, d_{2m}=1.45)$ modeling the likelihood of "Leslie" being exposed to the given media m at any time during the aggregate monitoring interval made of the "Day 1" and "Day 2" component monitoring intervals.

Figure 6:
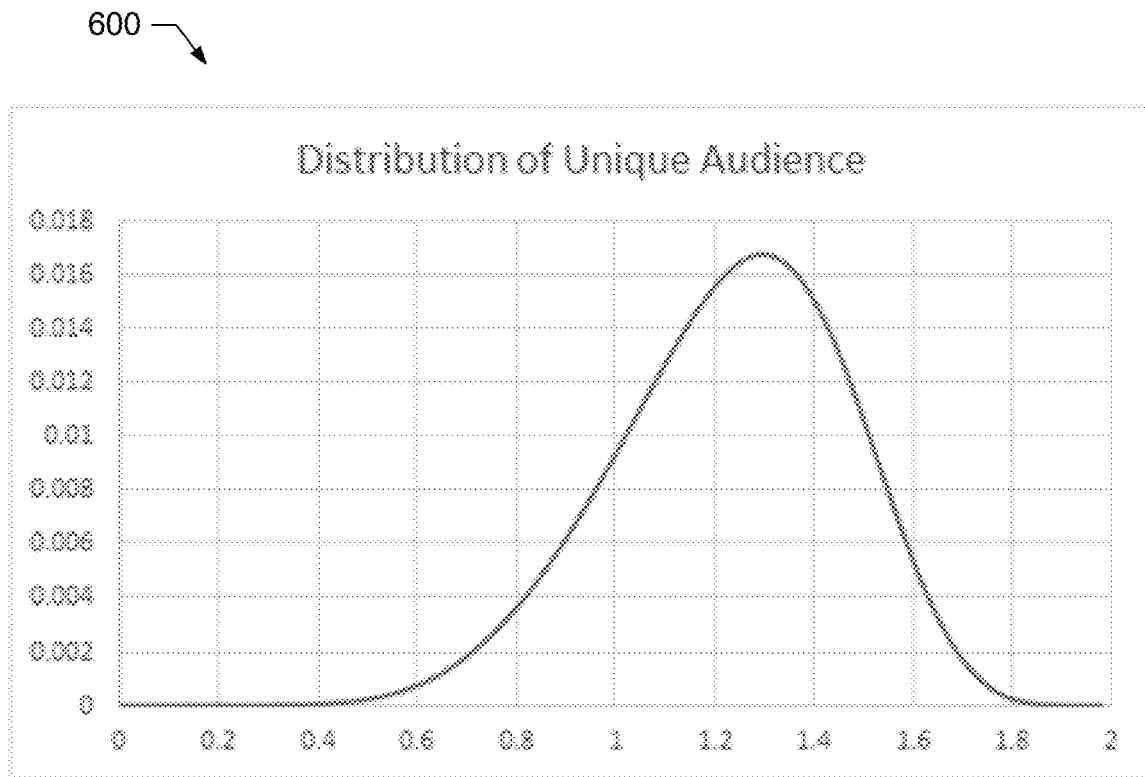

FIG. 6 illustrates an example audience-level probability distribution 600 determined by the audience metric determiner 120 of FIG. 3 using the example aggregate interval probability distributions 505 and 510 of FIG. 5. To determine the example audience-level probability distribution 600, the example distribution convolver 345 of the example probability distribution evaluator 340 included in the audience metric determiner 120 numerically convolves the first example aggregate interval probability distribution 505 corresponding to "Jim" and the second example aggregate interval probability distribution 510 corresponding to "Leslie." The resulting example audience-level probability distribution 600 models the likelihood of different possible unique numbers of monitored individuals being exposed to the given media m at any time during the aggregate monitoring interval including the "Day 1" and "Day 2" component monitoring intervals. The example distribution integrator 350 of the example probability distribution evaluator 340 included in the audience metric determiner 120 can then numerically integrate the example audience-level probability distribution 600 to determine metrics characterizing the audience of the given media m. For example, the distribution integrator 350 can numerically integrate the example audience-level probability distribution 600 according to Equation 15 provided above to determine the expected number of unique individuals estimated to be in the audience of media m during the specified aggregate monitoring interval is $E_m(x)=1.23$. As another example, the distribution integrator 350 can numerically integrate the example audience-level probability distribution 600 according to Equation 13 provided above to determine the probability of the number of unique audience members being at least 1 is 83.3%.

While an example manner of implementing the audience metric determiner 120 is illustrated in FIG. 3, one or more of the elements, processes and/or devices illustrated in FIG. 3 may be combined, divided, re-arranged, omitted, eliminated and/or implemented in any other way. Further, the example data interface 305, the example query parser 310, the example distribution parameter determiner 315, the example probability distribution parameter storage 320, the example probability distribution determiner 325, the example distribution parameter retriever 330, the example distribution parameter combiner 335, the example probability distribution evaluator 340, the example distribution convolver 345, the example distribution integrator 350 and/or, more generally, the example audience metric determiner 120 of FIG. 3 may be implemented by hardware, software, firmware and/or any combination of hardware, software and/or firmware. Thus, for example, any of the example data interface 305, the example query parser 310, the example distribution parameter determiner 315, the example probability distribution parameter storage 320, the example probability distribution determiner 325, the example distribution parameter retriever 330, the example distribution parameter combiner 335, the example probability distribution evaluator 340, the example distribution convolver 345, the example distribution integrator 350 and/or, more generally, the example audience metric determiner 120 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audience metric determiner 120, the example data interface 305, the example query parser 310, the example distribution parameter determiner 315, the example probability distribution parameter storage 320, the example probability distribution determiner 325, the example distribution parameter retriever 330, the example distribution parameter combiner 335, the example probability distribution evaluator 340, the example distribution convolver 345 and/or the example distribution integrator 350 is/are hereby expressly defined to include a tangible computer readable storage device or storage disk such as a memory, a digital versatile disk (DVD), a compact disk (CD), a Blu-ray disk, etc. storing the software and/or firmware. Further still, the example audience metric determiner 120 of FIG. 3 may include one or more elements, processes and/or devices in addition to, or instead of, those illustrated in FIG. 3, and/or may include more than one of any or all of the illustrated elements, processes and devices.

Figure 7:
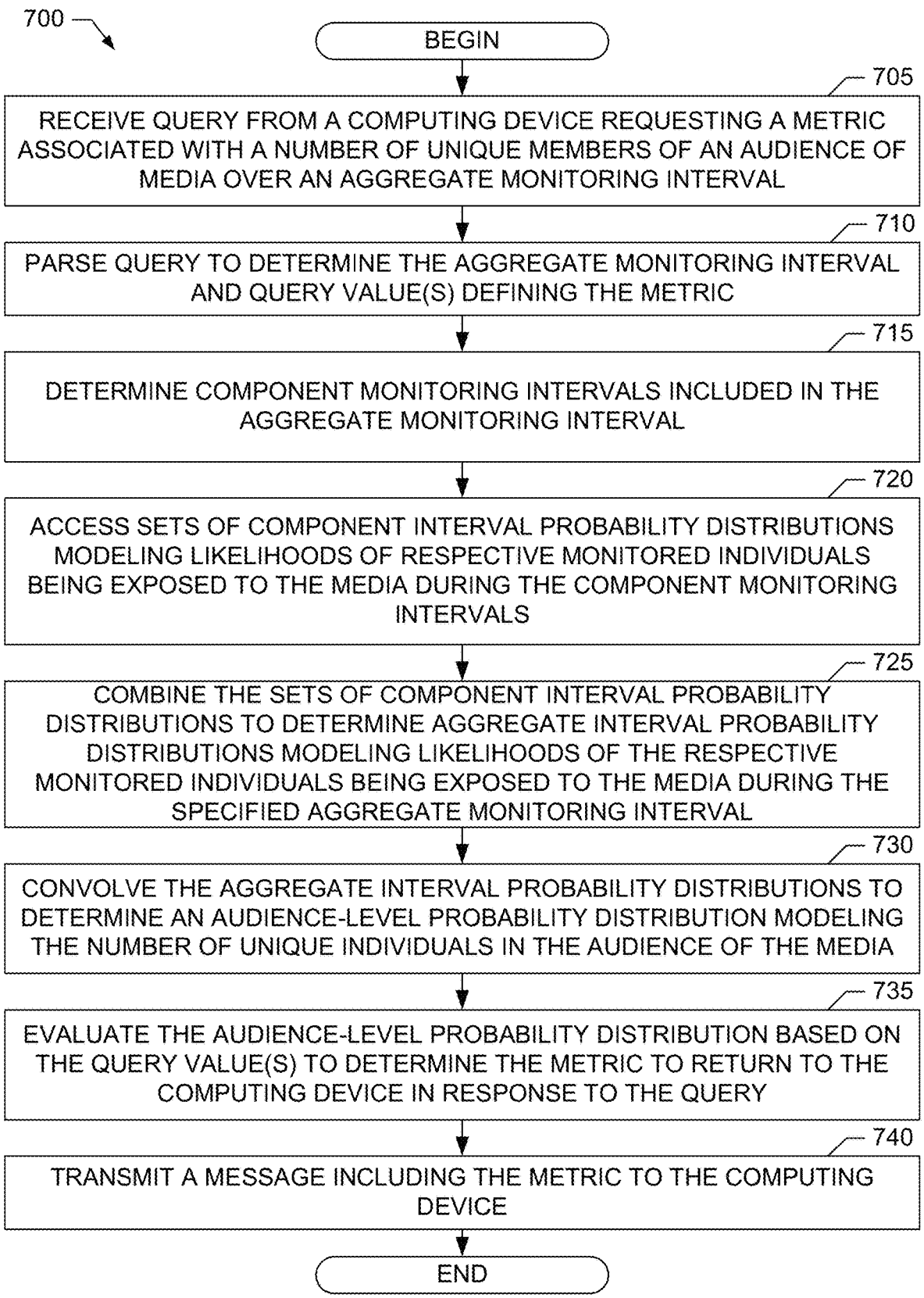
FIG. 7 is a flowchart representative of example computer readable instructions that may be executed to implement the example probabilistic audience estimator of FIG. 3.

A flowchart representative of example machine readable instructions for implementing the example audience metric determiner 120, the example data interface 305, the example query parser 310, the example distribution parameter determiner 315, the example probability distribution parameter storage 320, the example probability distribution determiner 325, the example distribution parameter retriever 330, the example distribution parameter combiner 335, the example probability distribution evaluator 340, the example distribution convolver 345 and/or the example distribution integrator 350 is shown in FIG. 7. In this example, the machine readable instructions comprise one or more programs for execution by a processor, such as the processor 812 shown in the example processor platform 800 discussed below in connection with FIG. 8. The one or more programs, or portion(s) thereof, may be embodied in software stored on a tangible computer readable storage medium such as a CD-ROM, a floppy disk, a hard drive, a digital versatile disk (DVD), a Blu-Ray Disk™, or a memory associated with the processor 812, but the entire program or programs and/or portions thereof could alternatively be executed by a device other than the processor 812 and/or embodied in firmware or dedicated hardware (e.g., implemented by an ASIC, a PLD, an FPLD, discrete logic, etc.). Further, although the example program(s) is(are) described with reference to the flowchart illustrated in FIG. 7, many other methods of implementing the example audience metric determiner 120, the example data interface 305, the example query parser 310, the example distribution parameter determiner 315, the example probability distribution parameter storage 320, the example probability distribution determiner 325, the example distribution parameter retriever 330, the example distribution parameter combiner 335, the example probability distribution evaluator 340, the example distribution convolver 345 and/or the example distribution integrator 350 may alternatively be used. For example, with reference to the flowchart illustrated in FIG. 7, the order of execution of the blocks may be changed, and/or some of the blocks described may be changed, eliminated, combined and/or subdivided into multiple blocks.

As mentioned above, the example process of FIG. 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 7 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

An example program 700 that may be executed to implement the example audience metric determiner 120 of FIG. 3 is illustrated in FIG. 7. With reference to the preceding figures and associated written descriptions, the example program 700 of FIG. 7 begins execution at block 705 at which the example audience metric determiner 120 receives, via the example data interface 305, a query from a computing device requesting a metric associated with a number of unique members of an audience of media during an aggregate monitoring interval specified in the query, as described above. At block 710, the example query parser 310 of the audience metric determiner 120 parses, as described above, the received query to determine the aggregate monitoring interval specified in the query, as well as one or more query values defining the metric being requested, such as an identifier identifying the media, a type value specifying the type of metric being requested, one or more parameter values corresponding to the type of metric being requested, etc.

At block 715, the example distribution parameter retriever 330 of the example probability distribution determiner 325 of the audience metric determiner 120 determines, as described above, the component monitoring intervals j making up or otherwise included in the aggregate monitoring interval specified in the received query. At block 720, the distribution parameter retriever 330 accesses the sets of component interval probability distributions $p_{ijm}(x)$ stored in the example probability distribution parameter storage 320 of the audience metric determiner 120 and modeling likelihoods of respective monitored individuals i being exposed to the media m identified in the query during respective ones of the component monitoring intervals j determined at block 715. For example, at block 720, the distribution parameter retriever 330 can access the probability distribution parameter storage 320 to retrieve the respective shape parameters $a_{ijm}$ and $b_{ijm}$ for the different component interval beta probability distributions $p_{ijm}(x)=\beta(x; a_{ijm}, b_{ijm})$ modeling the likelihoods of the respective monitored individuals i being exposed to the media m during respective ones of the component monitoring intervals j, as described above.

At block 725, the example distribution parameter combiner 335 of the example probability distribution determiner 325 of the audience metric determiner 120 combines the sets of component interval probability distributions $p_{ijm}(x)$ accessed at block 720 to determine aggregate interval probability distributions $f_{im}(x)$ modeling likelihoods of the respective monitored individuals i being exposed to the media m identified in the query at any time during the aggregate monitoring interval specified in the query. For example, at block 725, the distribution parameter combiner 335 can combine, according to Equations 7-10 as described above, the shape parameters $a_{ijm}$ and $b_{ijm}$ retrieved at block 720 for the different component interval beta probability distributions $p_{ijm}(x)=\beta(x; a_{ijm}, b_{ijm})$ to determine the respective shape parameters $c_{im}$ and $d_{im}$ defining the aggregate interval beta probability distributions $f_{im}(x)=(x; c_{im}, d_{im})$ modeling the likelihoods of the different, respective monitored individuals i being exposed to the media m identified in the received query at any time during the aggregate monitoring interval specified in the received query and made up of component monitoring intervals j=1, . . . , N.

At block 730, the example distribution convolver 345 of the example probability distribution evaluator 340 of the audience metric determiner 120 numerically convolves, as described above, the aggregate interval probability distributions $f_{im}(x)$ determined at block 725 to determine an audience-level probability distribution $f_m(x)$ modeling the likelihood of different possible unique numbers of monitored individuals being exposed to the media m at any time during the aggregate monitoring interval specified in a received query. At block 735, the example distribution integrator 350 of the example probability distribution evaluator 340 of the audience metric determiner 120 evaluates the audience-level probability distribution $f_m(x)$ determined at block 730 to determine the metric specified in the received query. For example, at block 735, the distribution integrator 350 determines the requested metric by numerically integrating the audience-level probability distribution according to, for example, one or more of Equations 12 to 16, as described above. At block 740, the probability distribution evaluator 340 returns the requested metric to the computing device that sent the query by transmitting a message including the metric to the computing device via the data interface 305, as described above. Execution of the example program 700 then ends.

Figure 8:
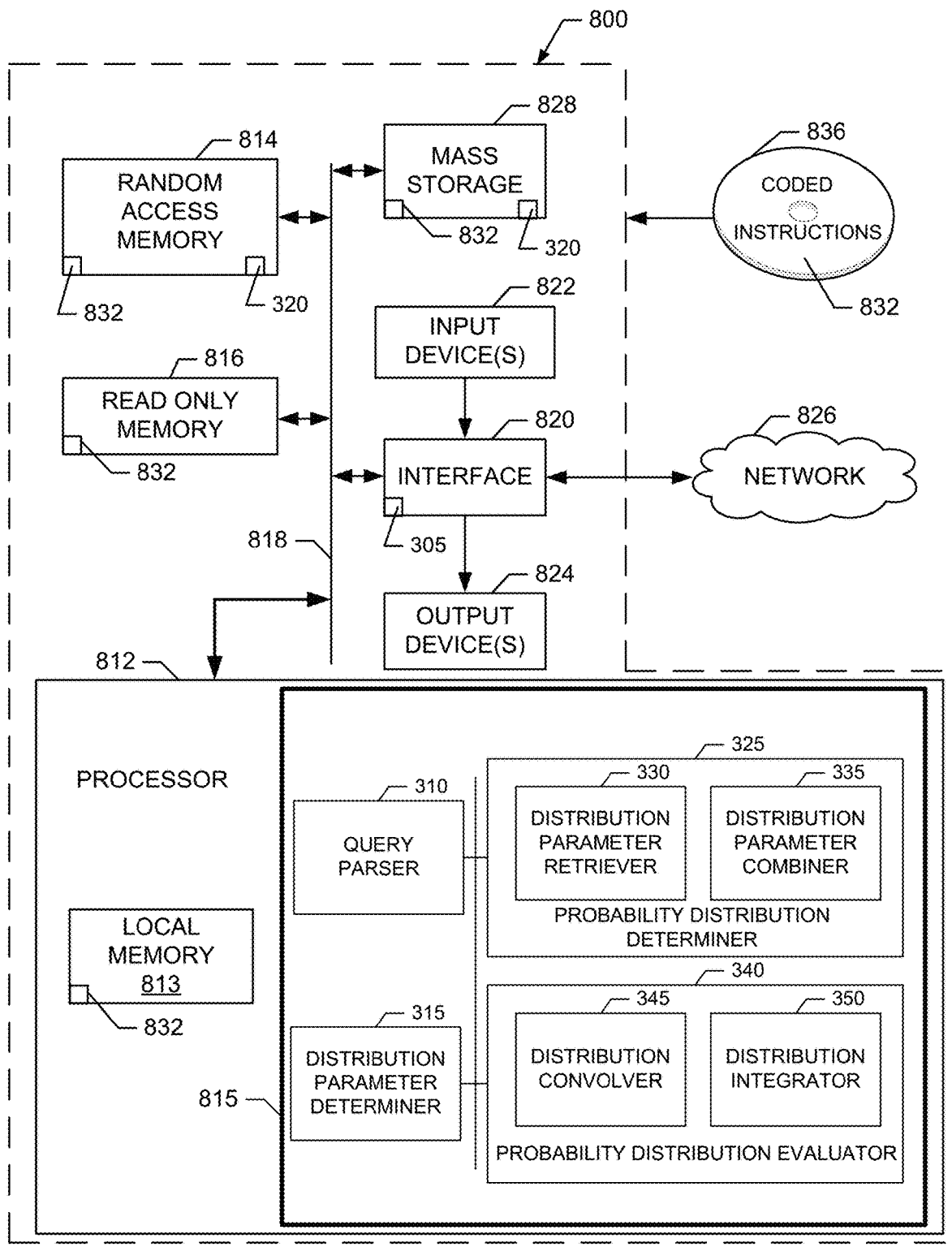
FIG. 8 is a block diagram of an example processor platform structured to execute the example computer readable instructions of FIG. 7 to implement the example probabilistic audience estimator of FIG. 3.

FIG. 8 is a block diagram of an example processor platform 800 capable of executing the instructions of FIG. 7 to implement the example audience metric determiner 120 of FIG. 3. The processor platform 800 can be, for example, a server, a personal computer, a mobile device (e.g., a cell phone, a smart phone, a tablet such as an iPad™), a personal digital assistant (PDA), an Internet appliance, etc., or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example of FIG. 8, the processor 812 includes one or more example processing cores 815 configured via example instructions 832, which include the example instructions of FIG. 7, to implement the example query parser 310, the example distribution parameter determiner 315, the example probability distribution determiner 325, the example distribution parameter retriever 330, the example distribution parameter combiner 335, the example probability distribution evaluator 340, the example distribution convolver 345 and the example distribution integrator 350 of FIG. 3.

The processor 812 of the illustrated example includes a local memory 813 (e.g., a cache). The processor 812 of the illustrated example is in communication with a main memory including a volatile memory 814 and a non-volatile memory 816 via a link 818. The link 818 may be implemented by a bus, one or more point-to-point connections, etc., or a combination thereof. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 800, can allow the user to control the computer system and provide data to the computer using physical gestures, such as, but not limited to, hand or body movements, facial expressions, and face recognition.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.). In the illustrated example of FIG. 8, the interface circuit 820 is also structured to implement the example data interface 305 of FIG. 3.

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID (redundant array of independent disks) systems, and digital versatile disk (DVD) drives. In some examples, the mass storage device 830 may implement the example probability distribution parameter storage 320 of FIG. 3. Additionally or alternatively, in some examples, the volatile memory 818 may implement the example probability distribution parameter storage 320 of FIG. 3.

Coded instructions 832 corresponding to the instructions of FIG. 7 may be stored in the mass storage device 828, in the volatile memory 814, in the non-volatile memory 816, in the local memory 813 and/or on a removable tangible computer readable storage medium, such as a CD or DVD 836.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   memory;
   computer readable instructions; and
   processor circuitry to execute the computer readable instructions to at least:
      estimate parameters of respective sets of first probability distributions for corresponding monitored individuals based on impression data collected responsive to beacon requests from client devices that accessed instances of media, a first one of the sets of the first probability distributions to model likelihoods of exposure by a first one of the monitored individuals to ones of the instances of media during ones of a plurality of component time intervals;
      parse a query from a compute device to identify a first one of the instances of media, an aggregate time interval and an audience metric to be returned in response to the query;
      combine the parameters of ones of the sets of first probability distributions corresponding to the first one of the instances of media and the ones of the component time intervals included in aggregate time interval to determine a second probability distribution to model exposure of an audience to the first one of the instances of media during the aggregate time interval; and
      cause transmission of a response including a value of the audience metric to the compute device in response to the query, the value based on the second probability distribution.

2. The apparatus of claim 1, wherein to combine the parameters, the processor circuitry is to:
   identify a first subset of the first one of the sets of the first probability distributions corresponding to the first one of the instances of media and the ones of the component time intervals included in aggregate time interval;
   combine first parameters of ones of the first probability distributions included in the first subset to determine a third probability distribution to model exposure of the first one of the monitored individuals to the first one of the instances of media during the aggregate time interval; and
   determine the second probability distribution based on the third probability distribution.

3. The apparatus of claim 2, wherein to combine the parameters, the processor circuitry is to:
  identify a second subset of a second one of the sets of the first probability distributions corresponding to the first one of the instances of media and the ones of the component time intervals included in aggregate time interval, the second one of the sets of the first probability distributions to model likelihoods of exposure by a second one of the monitored individuals to the ones of the instances of media during the ones of the plurality of component time intervals;
  combine second parameters of ones of the first probability distributions included in the second subset to determine a fourth probability distribution to model exposure of the second one of the monitored individuals to the first one of the instances of media during the aggregate time interval; and
  determine the second probability distribution based on the third probability distribution and the fourth probability distribution.

4. The apparatus of claim 3, wherein the processor circuitry is to numerically convolve the third probability distribution and the fourth probability distribution to determine the second probability distribution.

5. The apparatus of claim 1, wherein the processor circuitry is to determine the value of the of the audience metric based on a numerical integration of the second probability distribution.

6. The apparatus of claim 5, wherein the processor circuitry is to perform the numerical integration based on a query value included in the query.

7. The apparatus of claim 6, wherein the query value is a first query value, and the processor circuitry is to parse the query to determine the first query value and a second query value, the second query value to identify the audience metric to be returned in response to the query, the audience metric to be one of a plurality of possible audience metrics identified by a corresponding plurality of possible values of the second query value.

8. At least one non-transitory computer readable medium comprising computer readable instructions that, when executed, cause at least one processor to at least:
  estimate parameters of respective sets of first probability distributions for corresponding monitored individuals based on impression data collected responsive to beacon requests from client devices that accessed instances of media, a first one of the sets of the first probability distributions to model likelihoods of exposure by a first one of the monitored individuals to ones of the instances of media during ones of a plurality of component time intervals;
  parse a query from a compute device to identify a first one of the instances of media, an aggregate time interval and an audience metric to be returned in response to the query;
  combine the parameters of ones of the sets of first probability distributions corresponding to the first one of the instances of media and the ones of the component time intervals included in aggregate time interval to determine a second probability distribution to model exposure of an audience to the first one of the instances of media during the aggregate time interval; and
  cause transmission of a response including a value of the audience metric to the compute device in response to the query, the value based on the second probability distribution.

9. The at least one non-transitory computer readable medium of claim 8, wherein to combine the parameters, the instructions cause the at least one processor to:
  identify a first subset of the first one of the sets of the first probability distributions corresponding to the first one of the instances of media and the ones of the component time intervals included in aggregate time interval;
  combine first parameters of ones of the first probability distributions included in the first subset to determine a third probability distribution to model exposure of the first one of the monitored individuals to the first one of the instances of media during the aggregate time interval; and
  determine the second probability distribution based on the third probability distribution.

10. The at least one non-transitory computer readable medium of claim 9, wherein to combine the parameters, the instructions cause the at least one processor to:
  identify a second subset of a second one of the sets of the first probability distributions corresponding to the first one of the instances of media and the ones of the component time intervals included in aggregate time interval, the second one of the sets of the first probability distributions to model likelihoods of exposure by a second one of the monitored individuals to the ones of the instances of media during the ones of the plurality of component time intervals;
  combine second parameters of ones of the first probability distributions included in the second subset to determine a fourth probability distribution to model exposure of the second one of the monitored individuals to the first one of the instances of media during the aggregate time interval; and
  determine the second probability distribution based on the third probability distribution and the fourth probability distribution.

11. The at least one non-transitory computer readable medium of claim 10, wherein the instructions cause the at least one processor to numerically convolve the third probability distribution and the fourth probability distribution to determine the second probability distribution.

12. The at least one non-transitory computer readable medium of claim 8, wherein the instructions cause the at least one processor to determine the value of the of the audience metric based on a numerical integration of the second probability distribution.

13. The at least one non-transitory computer readable medium of claim 12, wherein the instructions cause the at least one processor to perform the numerical integration based on a query value included in the query.

14. The at least one non-transitory computer readable medium of claim 13, wherein the query value is a first query value, and the instructions cause the at least one processor to parse the query to determine the first query value and a second query value, the second query value to identify the audience metric to be returned in response to the query, the audience metric to be one of a plurality of possible audience metrics identified by a corresponding plurality of possible values of the second query value.

15. A method comprising:
  estimating, by executing an instruction with at least one processor, parameters of respective sets of first probability distributions for corresponding monitored individuals based on impression data collected responsive to beacon requests from client devices that accessed instances of media, a first one of the sets of the first probability distributions to model likelihoods of exposure by a first one of the monitored individuals to ones of the instances of media during ones of a plurality of component time intervals;

parsing a query from a compute device to identify a first one of the instances of media, an aggregate time interval and an audience metric to be returned in response to the query;

combining, by executing an instruction with the at least one processor, the parameters of ones of the sets of first probability distributions corresponding to the first one of the instances of media and the ones of the component time intervals included in aggregate time interval to determine a second probability distribution to model exposure of an audience to the first one of the instances of media during the aggregate time interval; and transmitting a response including a value of the audience metric to the compute device in response to the query, the value based on the second probability distribution.

16. The method of claim 15, wherein the combining includes:

identifying a first subset of the first one of the sets of the first probability distributions corresponding to the first one of the instances of media and the ones of the component time intervals included in aggregate time interval;

combining first parameters of ones of the first probability distributions included in the first subset to determine a third probability distribution to model exposure of the first one of the monitored individuals to the first one of the instances of media during the aggregate time interval; and determining the second probability distribution based on the third probability distribution.

17. The method of claim 16, wherein the combining includes:

identifying a second subset of a second one of the sets of the first probability distributions corresponding to the first one of the instances of media and the ones of the component time intervals included in aggregate time interval, the second one of the sets of the first probability distributions to model likelihoods of exposure by a second one of the monitored individuals to the ones of the instances of media during the ones of the plurality of component time intervals;

combining second parameters of ones of the first probability distributions included in the second subset to determine a fourth probability distribution to model exposure of the second one of the monitored individuals to the first one of the instances of media during the aggregate time interval; and determining the second probability distribution based on the third probability distribution and the fourth probability distribution.

18. The method of claim 17, wherein the determining of the second probability distribution includes numerically convolving the third probability distribution and the fourth probability distribution to determine the second probability distribution.

19. The method of claim 15, further including determining the value of the of the audience metric based on a numerical integration of the second probability distribution, the numerical integration based on a query value included in the query.

20. The method of claim 19, wherein the query value is a first query value, and the parsing includes parsing the query to determine the first query value and a second query value, the second query value to identify the audience metric to be returned in response to the query, the audience metric to be one of a plurality of possible audience metrics identified by a corresponding plurality of possible values of the second query value.

\* \* \* \* \*